(12) United States Patent
Kawasaki et al.

(10) Patent No.: US 8,837,812 B2
(45) Date of Patent: Sep. 16, 2014

(54) IMAGE PROCESSING DEVICE, IMAGE PROCESSING METHOD, AND PROGRAM

(75) Inventors: Hiroshi Kawasaki, Saitama (JP); Ryo Furukawa, Hiroshimi (JP); Ryusuke Sagawa, Ibaraki (JP); Yasushi Yagi, Ibaraki (JP)

(73) Assignee: Techno Dream 21 Co., Ltd., Saitama (JP)

( * ) Notice: Subject to any disclaimer, the term of this patent is extended or adjusted under 35 U.S.C. 154(b) by 803 days.

(21) Appl. No.: 12/997,088

(22) PCT Filed: Jun. 4, 2009

(86) PCT No.: PCT/JP2009/002511
§ 371 (c)(1),
(2), (4) Date: Dec. 9, 2010

(87) PCT Pub. No.: WO2009/150799
PCT Pub. Date: Dec. 17, 2009

(65) Prior Publication Data
US 2011/0081072 A1    Apr. 7, 2011

(30) Foreign Application Priority Data
Jun. 13, 2008    (JP) ................. 2008-155605

(51) Int. Cl.
*G06K 9/00* (2006.01)
*G06T 1/00* (2006.01)
*G01B 11/25* (2006.01)
*G06T 7/00* (2006.01)

(52) U.S. Cl.
CPC . *G01B 11/25* (2013.01); *G06T 1/00* (2013.01); *G06T 2207/10028* (2013.01); *G06T 2200/08* (2013.01); *G06T 7/0057* (2013.01)
USPC ........................................ 382/154; 382/294

(58) Field of Classification Search
USPC .................................................. 382/154, 294
See application file for complete search history.

(56) References Cited

U.S. PATENT DOCUMENTS 4,802,759 A * 2/1989 Matsumoto et al. .......... 356/603
5,917,937 A * 6/1999 Szeliski et al. ................ 382/154
(Continued)

FOREIGN PATENT DOCUMENTS

JP    A-63-44107    2/1988
JP    A-2000-512012    9/2000
(Continued)

OTHER PUBLICATIONS

Self calibration of multiple—reconstruction, Furukawa et al., IEICE transaction, 2007, vol. J90-D No. 8, pp. 1848-1857 (see IDS filed on Apr. 13, 2011).*

(Continued)

*Primary Examiner* — Jayesh A Patel
(74) *Attorney, Agent, or Firm* — Oliff PLC

(57) ABSTRACT

Provided are an image processing device, an image processing method, and a program which are capable of high density restoration and which are also strong to image processing. An image processing device mainly consists of a projector serving as a projection means, a camera as a photographing means, and an image processing means consisting of, for example, a personal computer. The image processing means acquires the intersection point between patterns from a photographed image and calculates a first solution including degree of freedom by using the constraint condition of a first tentative plane and a second tentative plane including the intersection point and the constraint condition obtained from the positional relationship between the projector and the camera. The degree of freedom is cancelled by primary search, thereby restoring a three-dimensional shape.

14 Claims, 11 Drawing Sheets

(56) References Cited

U.S. PATENT DOCUMENTS

| | | | |
|---|---|---|---|
| 6,510,244 B2 * | 1/2003 | Proesmans et al. | 382/203 |
| 7,747,067 B2 * | 6/2010 | Popescu et al. | 382/154 |
| 7,876,455 B2 * | 1/2011 | Kawasaki et al. | 356/607 |
| 2002/0057832 A1 * | 5/2002 | Proesmans et al. | 382/154 |

FOREIGN PATENT DOCUMENTS

| | | | | |
|---|---|---|---|---|
| WO | WO 97/41942 A1 | | 12/1997 | |
| WO | WO 2006013635 A1 * | | 2/2006 | G01B 11/24 |

OTHER PUBLICATIONS

Shape reconstruction—constraints, Kawasaki et al., Springer, ACCV 2007, Part II, LNCS 4844, p. 847-857.*

Shape reconstruction—Geometries, Kawasaaki et al., Springer, Published on line Nov. 15, 2008, pp. 135-148.*

Inokuchi, S. et al., "Range-Imaging System for 3-D Object Recognition," *ICPR*, 1984, pp. 806-808.

Je, C. et al., "High-Contrast Color-Stripe Pattern for Rapid Structured-Light Range Imaging," *ECCV*, 2004, pp. 95-107, vol. 1.

Pan, J. et al., "Color-coded binary fringe projection technique for 3-D shape measurement," *Optical Engineering*, Feb. 2005, pp. 023606-1-023606-9, vol. 44, No. 2.

Salvi, J. et al., "A robust-coded pattern projection for dynamic 3D scene measurement," *Pattern Recognition Letters*, 1998, pp. 1055-1065, vol. 19, No. 11.

Rusinkiewicz, S. et al., "Real-Time 3D Model Acquisition," ACM SIGGRAPH, 2002, pp. 438-446.

Hall-Holt, O. et al., "Stripe Boundary Codes for Real-Time Structured-Light Range Scanning of Moving Objects," *ICCV*, 2001, pp. 359-366, vol. 2.

Zhang, L. et al., "Spacetime Faces: High Resolution Capture for Modeling and Animation," *ACM Annual Conference on Computer Graphics*, Aug. 2004, pp. 548-558.

Koninckx, T. et al., "Real-Time Range Acquisition by Adaptive Structured Light," *IEEE Transactions on Pattern Analysis and Machine Intelligence*, Mar. 2006, pp. 432-445, vol. 28, No. 3.

Furukawa, R. et al., "Self-calibration of Multiple Laser Planes for 3D Scene Reconstruction," IEICE Trans., 2007, pp. 1848-1857, vol. J90-D, No. 8 (with translation).

International Search Report issued in International Application No. PCT/JP2009/002511 on Jul. 14, 2009 (with translation).

* cited by examiner (A)

16: Image processing method  14: Camera  12: Projector
10: Image processing apparatus (B)

Captured Image (A)

(B)

(C)

IMAGE PROCESSING DEVICE, IMAGE PROCESSING METHOD, AND PROGRAM

FIELD OF INVENTION

The present invention relates to an image processing device, image processing method, and program, especially to an image processing device, image processing method, and program for reconstructing a 3D shape from input 2D image.

BACKGROUND OF INVENTION

To measure 3D shapes of dynamic scenes or objects, such as human facial expressions or body motions, speed, density and accuracy of measurement are crucial. Since passive stereo techniques have difficulties in reconstructing textureless surfaces densely and accurately, active 3D measurement techniques, especially those using high-speed structured light systems, have been extensively studied in recent years for capturing dynamic scenes.

Since a structured light system reconstructs 3D shape by projecting single or multiple patterns on a scene by a projector and capturing the scene by a camera, correspondences between feature points of projected pattern and captured scene is required. Many structured light systems temporally encode positional information of a projector's pixel into multiple patterns. Recently, structured light systems that can capture a dynamic scene by reducing the required number of patterns and increasing pattern speed have been proposed. These systems assume that there is little motion in a scene while a sufficient number of patterns for decoding are projected. In addition, the design of high-speed synchronization system is also an issue.

On the other hand, 'one-shot' structured light techniques using only single images in which positional information of the projectors' pixels are embedded into spatial patterns of the projected images have also been studied. Although the techniques can resolve the issues of rapid motions and synchronization, they typically use patterns of complex intensities or colors to encode positional information into local areas. Because of the complex patterns, they often require assumptions of smooth surface or reflectance, and the image processing tends to be difficult and to be low resolution. If the assumptions do not hold, the decoding process of the patterns may be easily affected and leads to unstable reconstruction.

As for a commonly used constraint to determine correspondences for structured light system, there is epipolar constraint. However, in case of a number of feature point is large or there are several feature points on a epipolar line because of a condition of arrangement of feature points, correspondences cannot be uniquely determined.

Shape reconstruction techniques with a structured light system, which encode positional information of a projector into temporal or spatial changes in a projected pattern, have been largely investigated. A technique using only temporal changes is easy to implement, so it has commonly been used thus far [Non Patent Literature 1].

Techniques using only spatial encoding of a pattern allow scanning with only a single-frame image (a.k.a. one-shot scan) [Non Patent Literature 2-4].

Non patent literature 5 shows reduced number of patterns by using both of temporal change and spatial change.

Although it does not strictly involve a structured light system, methods of shape reconstruction to include movement by spatiotemporal stereo matching are proposed [Non Patent Literature 6 and 7].

On the other hand, a technique allowing dense shape reconstruction based on a single image using a simple pattern, i.e. a set of stripes is proposed [Non Patent Literature 8].

[Non Patent Literature 1] S. Inokuchi, K. Sato, and F. Matsuda. Range imaging system for 3-D object recognition. In ICPR, pages 806-808, 1984.2

[Non Patent Literature 2] C. Je, S. W. Lee, And R.-H. Park. High-Contrast Color-stripe pattern for rapid structured-light range imaging. In ECCV, volume1, pages 95-107, 2004. 2, 5.

[Non Patent Literature 3] J. Pan, P. S. Huang, and F.-P. Chiang. Color-coded binary fringe projection technique for 3-d shape measurement. Optical Engineering, 44 (2): 23606-23615, 2005.

[Non Patent Literature 4] J. Salvi, J. Batlle, and E. M. Mouaddib. A robust-coded pattern projection for dynamic 3d scene measurement. Pattern Recognition, 19(11): 1055-1065, 1998.

[Non Patent Literature 5] S. Rusinkeiwicz: "Real-time 3D model acquisition", ACM SIGGRAPH, pp. 438-446 (2002).

[Non Patent Literature 6] O. Hall-Holt and S. Rusinkiewicz. Stripe boundary codes for real-time structured-light range scanning of moving objects. In ICCV, volume 2, pages 359-366, 2001.

[Non Patent Literature 7] L. Zhang, N. Snavely, B. Curless, and S. M. Seitz. Spacetime faces: High-resolution capture for modeling and animation. In ACM Annual Conference on Computer Graphics, pages 548-558, August 2004. 2

[Non Patent Literature 8] T. P. Koninckx and L. V. Gool. Real-time range acquisition by adaptive structured light. IEEE Trans. on PAMI, 28(3):432-445, March 2006.

SUMMARY OF THE INVENTION

Technical Problem

However, backgrounds of these techniques as seen above have following difficulties.

In terms of the technique described in [Non Patent Literature 1], since the technique uses multiple patterns necessary for decoding, it requires special attention to be applied to high-speed capturing.

In terms of the technique described in [Non Patent Literature 2-4], they encode positional information into a spatial pattern, and thus, there remains a problem for low resolution on the pattern and 3D reconstruction. In addition, because of requirement of unique codification in local area, patterns are usually become complex and image processing for detecting patter are also complex. Because of aforementioned reason, the decoding process of the patterns may be easily affected and leads to ambiguities near depth or color discontinuities.

In terms of the technique described in [Non Patent Literature 5], the technique is basically limited in that the scene must be static while multiple patterns are projected. In addition, since the method proposes a solution only for slow motion of rigid body object by aligning the reconstructed shape with respect to a rigid body constraint, it cannot be applied for non-rigid object with motion, such as human facial motion or body motion.

In terms of the technique described in [Non Patent Literature 6-7], with these techniques, a projector is only used to provide a texture that changes over time for a pair of stereo cameras and produce high-quality depth reconstructions. Since all the techniques assume continuous motion of an object, there remains an open problem that correct shapes cannot be reconstructed if there is a fast motion which makes a discontinuity in spatio-temporal space.

In addition, there are common problems for [Non Patent Literature 5-7], such as system needs extremely fast synchronization to adapt fast motion of object and/or processing cost tends to relatively high.

In terms of the technique described in [Non Patent Literature 8], Euclidean shape reconstruction was achieved by combining local shape reconstruction from dense stripes pattern (repetitive line pattern) and global positional registration by detecting supplemental sparse line pattern. Therefore, it remains an open problem that correct shapes cannot be reconstructed if it fails either detecting sparse line pattern or extracting stripe pattern.

The present invention is published by considering the aforementioned problems. The main target of the invention is to provide an image processing apparatus, image processing method, and program to achieve dense 3D shape reconstruction with robust image processing method.

Solution to Problem

In this invention, by using the technique which uses coplanar constraint derived from multiple images projected by a line laser to reconstruct a scene or shape, 3D shape is reconstructed from coplanar constraints of intersection points between two types of line patterns projected by a projector. Such a method can be found in, for example, "Shape Reconstruction from Cast Shadows using Coplanarities and Metric Constraints" ACCV, Part II, LINCS 4843, PP. 847-857, 2007.

The present invention is an image processing apparatus comprising:
  a light projection unit using a light source,
    said light source projecting a plane shaped light pattern, projecting a first pattern and a second pattern to an object,
    said first pattern being arranged to fulfill a first common constraint, and
    said second pattern being arranged to make an intersection with said first pattern and fulfill a second common constraint;
  an image capturing unit obtaining a 2D image by capturing a reflected pattern on said object,
    said reflected pattern being a projection of said plane shaped light pattern; and
  an image processing unit reconstructing a 3D shape of said object using said 2D image,
    wherein said image processing unit comprising:
      a first calculation unit configured to obtain an intersection point between a first captured pattern and a second captured pattern on said 2D image,
        said first captured pattern being observed as a reflected pattern of said first pattern, and
        said second captured pattern being observed as a reflected pattern of said second pattern; and
      a second calculation unit configured to calculate a first solution of a first undetermined plane and a second undetermined plane by using a constraint, said first common constraint, said second common constraint, and a first relative positional information;
        said first solution including a degree of freedom,
        said first undetermined plane being a plane including said first captured pattern,
        said second undetermined plane being a plane including said second captured pattern,
        said constraint being that said intersection point is included by said first undetermined plane and said second undetermined plane, and
        said first relative positional information being a relative positional information between said light projection unit and said image capturing unit.

Advantageous Effects of Invention

In our invention, by using a simple grid pattern consisting of a number of lines which can be distinguished only vertical or horizontal line, 3D reconstruction are achieved by using intersection points of those lines as feature points. By using such feature points, since relationship between feature points are obtained from connectivity of vertical and horizontal lines, 3D shape which are consistent under intersection of vertical and horizontal lines can be reconstructed as solution set of parameters by applying the shape from coplanarity constraint. In addition, a degree of freedom is one when grid pattern is known, and thus, it can be determined quickly by one dimensional search. Therefore, 3D shape of dynamic scene or moving objects can be densely reconstructed.

In addition, it has the advantages of the shape not necessarily needing to be globally smooth as long as the local connectivity of the grid points can be extracted and thus allows the shape to be restored even when there are abrupt changes in depth due to an occlusion or in color due to texture. Moreover, since only a discrimination of vertical and horizontal line is required for reconstruction, there remain only a small problem on image processing.

BRIEF DESCRIPTION OF THE DRAWINGS

Figure 1:
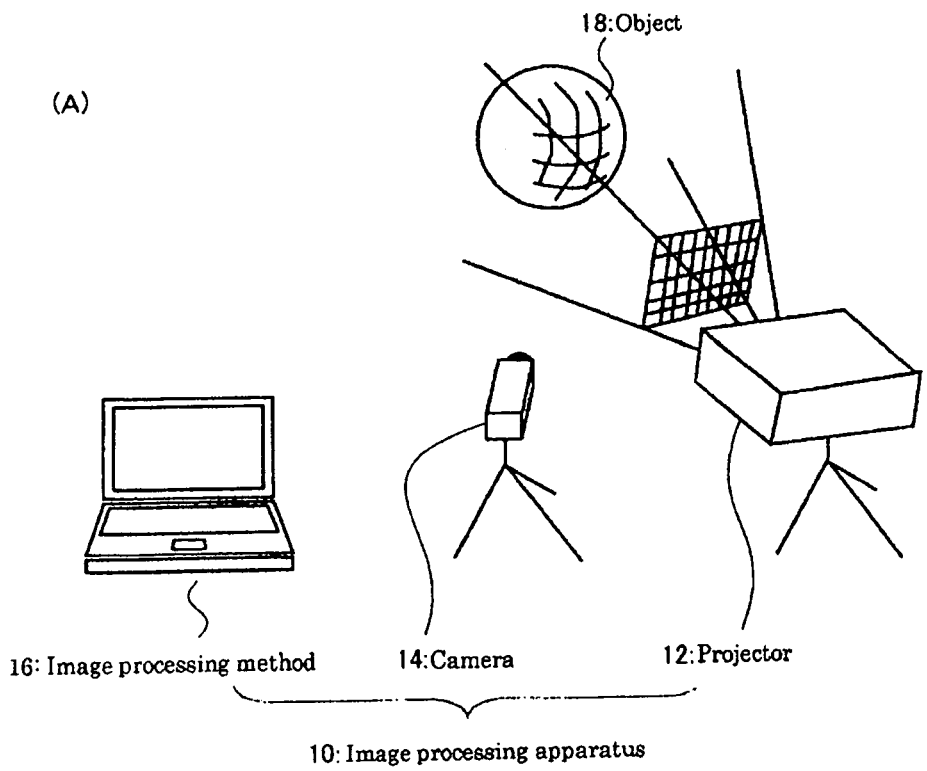
[FIG. 1] (A) illustrates the image processing apparatus of the invention and (B) illustrates the image processing method of the invention.
Figure 1:
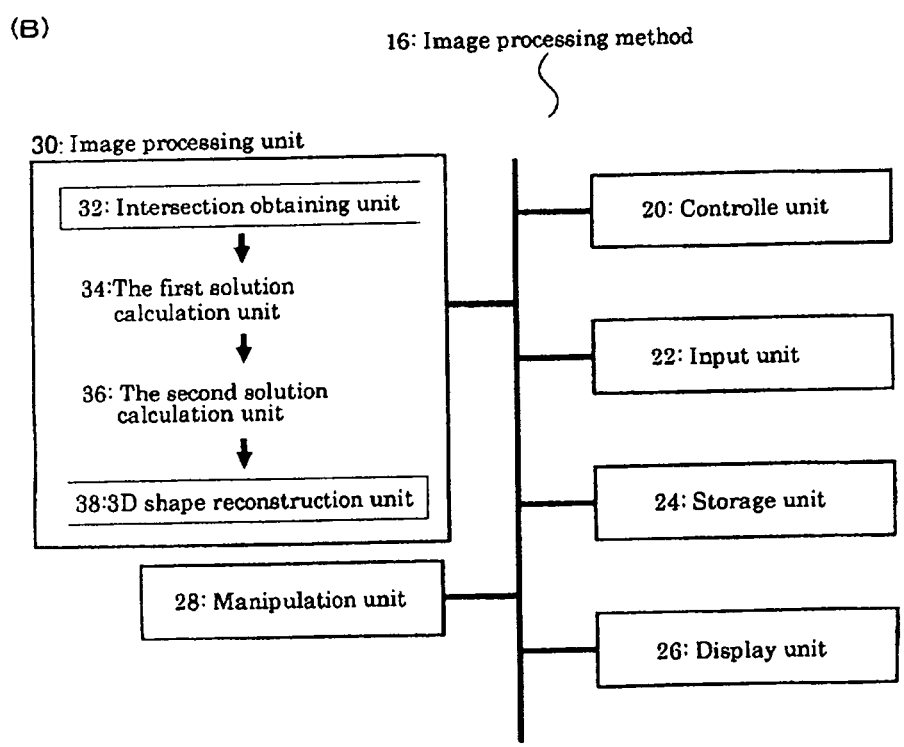

10 Image processing apparatus
12 Projector
14 Camera
16 Image processing method
18 Object
20 Controller unit
22 Input unit
24 Storage unit
26 Display unit
28 Manipulation unit
30 Image processing unit
32 Intersection obtaining unit
34 The first solution calculation unit
36 The second solution calculation unit
38 3D shape reconstruction unit

DETAILED DESCRIPTION OF EMBODIMENTS

<First Embodiment: Configuration of the Image Processing Apparatus>

Configuration of the image processing apparatus regarding to the embodiment of the present invention will now be explained referring to FIG. 1.

FIG. 1(A) is an example of configuration of the image processing unit 10 and FIG. 1(B) shows a configuration of the image processing method 16

Referring to FIG. 1(A), the image processing apparatus 10 according to the embodiment mainly includes projector 12 for light projection method, camera 14 for image capturing method and, for example, a personal computer for the image processing method 16.

Projector 12 has a function to project a light with predetermined pattern to a target object 18 and as for an actual device, for example, video projector can be considered. It is also possible to configure or align line-laser projectors as for an actual devise. Otherwise, using prism or beam-splitter to split laser light source into multiple directions is also possible. Projector 12 projects two types of patterns, such as vertical and horizontal directional pattern to a target object. Here, vertical pattern (the first pattern) and horizontal pattern (the second pattern) are perpendicular to each other and those are distinguished by for example color information. In this invention, only two patterns' discrimination is required, selection of two colors from RGB (red, green and blue) is one solution.

Further, different wave length for vertical and horizontal pattern is enough for the invention, invisible light source (e.g., infrared) can be used. In addition, to use specific wave length for light source, high precision discrimination can be achieved by capturing with a narrow band path filter. Further, it is not required to be perpendicular between vertical and horizontal patterns, but just making intersection is enough. Instead of color, width of pattern or angle of pattern can be used to distinguish two kinds of pattern. It is only required that vertical and horizontal lines are extracted from image, therefore, projecting a grid based pattern and extracting lines from an image or projecting a band where width is wider than a line and extracting boundary of the band are also sufficient. It is advantageous to use boundary of a band because it can extract two times pattern of a number of bands. Further, projecting checker board pattern and extracting a boundary of the pattern is also sufficient.

Camera 14 has a function to capture a reflected light from an object by projecting a light from projector 12 and as for an actual device, for example, CCD image sensor, solid imaging device, etc. can be used. 2D image is captured by camera 14 and by performing image process 16 on data based on 2D image, 3D shape of object 18 is reconstructed. Here, relative position of camera 14 and projector 12 can be either calibrated before scan, calibrated online, or self-calibrated, and can be assumed to be known.

Configuration of the image processing method 16 for 3D shape reconstruction from 2D image will now be explained referring to FIG. 1(B).

An image processing apparatus 16 according to the embodiment mainly includes an image processing unit 30, a control unit 20, an input unit 22, a storage unit 24, a display unit 26, and a manipulation unit 28. The schematic function of the image processing apparatus 16 is to processing 2D image so as to reconstruct and output 3D shape. In addition, an implemented image processing apparatus 16 may be constructed with a computer such as a personal computer where an application (program) of executing a predetermined function is installed or a dedicated image-processing apparatus of executing a predetermined function. In addition, units constituting the image processing apparatus 16 are electrically connected to each other via a bus.

The image processing unit 30 is a unit that mainly performs an image processing function. The image processing unit 30 includes a intersection obtaining unit 32, the first solution calculation unit 34, the second solution calculation unit 35, and 3D shape reconstruction unit 38.

The intersection obtaining unit 32 (the first solution calculation unit) is a unit that obtain intersection of vertical and horizontal patterns which are detected from 2D image captured by camera 14.

The first solution calculation unit 34 (the second calculation unit) is a unit that calculate the first solution including a degree of freedom by using a constraint that aforementioned patterns share intersection point, a constraint that plane including pattern pass through the predetermined common line and constraint obtained from the relative positional relationship between camera 14 and projector 12.

The second solution calculation unit 36 (the third calculation unit) is a unit that calculate the second solution by eliminating a degree of freedom of the first solution calculated by the first solution calculation unit.

3D shape reconstruction unit 38 is a unit that reconstructs the 3D shape of captured object using the calculated second solution.

Detail explanations of each unit of aforementioned image processing unit are described as image processing method in the followings.

The control unit 20 is a unit that controls operations of the entire units of the image processing apparatus 16 (the image processing unit 30, the input unit 22, the storage unit 24, and the display unit 26).

The input unit 22 is a unit where information is externally input to the image processing apparatus 16. In the embodiment, a movie or an image consist of 2-D image is input from the input unit 16.

The storage unit 24 is a fixed storage disk such as a HDD (hard disk drive), a detachable storage disk such as a CD (compact Disc) or DVD (digital versatile disk), a fixed or detachable semiconductor device, or the like. In the embodiment, a plurality of the 2-D image before the process and 3-D shape reconstructed from the 2-D image are stored in the storage unit 18.

In addition, a program for executing the image processing method described later is stored in the storage unit 24. The program allows functions of the aforementioned units to be executed by user's manipulation of the manipulation unit 28. More specifically, the units of the program are operated so that new 3-D shape reconstructed from the 2-D image.

The display unit 26 is, for example, a liquid crystal display, a CRT (cathode ray tube), a video projector, or the like. An image is displayed on the display unit 20 based on the input 23-D image data or the reconstructed 3-D shape data.

The manipulation unit 28 is, for example, a keyboard or a mouse. By the user's manipulation of the manipulation unit 28, the image processing apparatus 16 integrates a plurality of the 3-D shape data.

<Second Embodiment: Image Processing Method>

Before an explanation of the image processing method, planes that are configured by a pattern projected from projector is defined.

Figure 3:
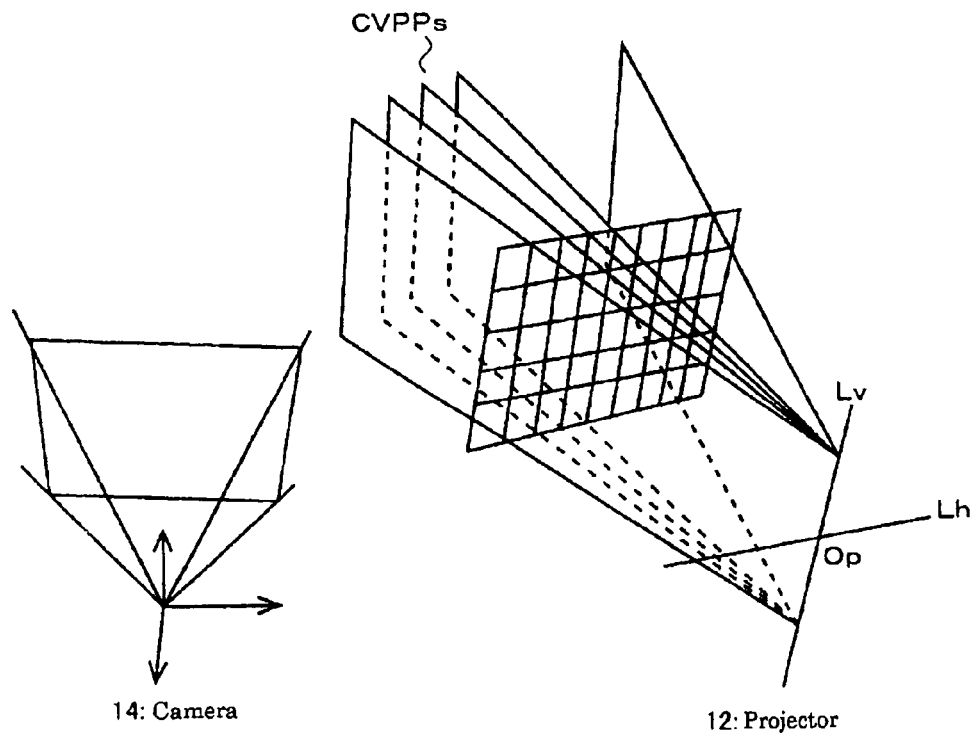
[FIG. 3] The figure illustrates the image processing method of the invention and the plane relating to the plane of the pattern irradiated by projector.
Figure 4:
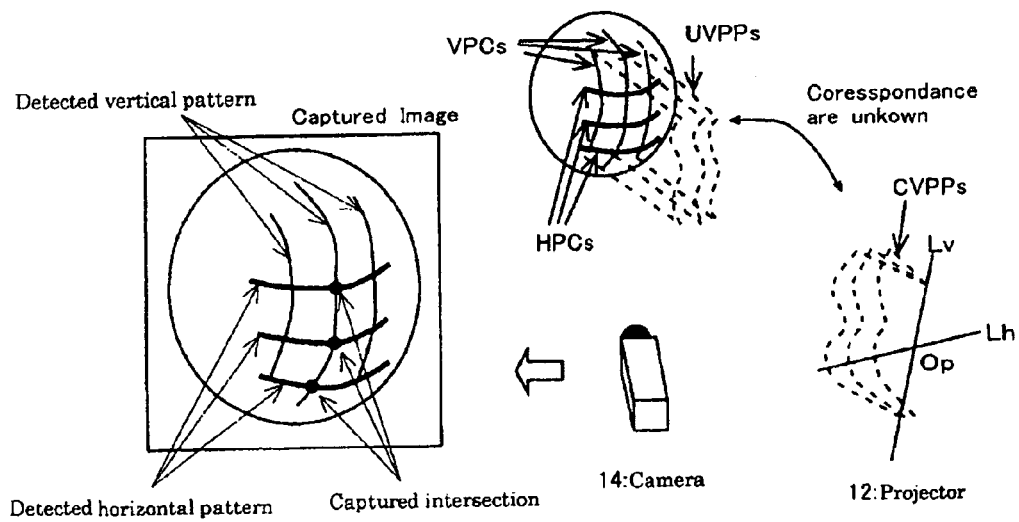
[FIG. 4] The figure illustrates the image processing method of the invention and the plane relating to the plane of the pattern irradiated by projector.

Referring to FIG. 3, a line pattern that is projected from projector 12 defines a plane in a 3D space. In other words, a straight pattern projected by the projector sweeps a plane in 3D space. Planes defined by a vertical pattern and a horizontal pattern are respectively referred to as a vertical pattern plane (VPP) and a horizontal pattern plane (HPP). The projector is assumed to have been calibrated. That is, all parameters for the VPPs and HPPs in 3D space are known (Hereafter, all the parameters and 3D positions for planes, lines and points are represented in the camera coordinate system.). A VPP and a HPP with known parameters are referred to as a calibrated VPP (CVPP) and a calibrated HPP (CHPP). In addition, all CVPPs are assumed to contain the same line (such a set of planes is also known as a pencil of planes). The same assumption holds for all CHPPs. These lines are denoted as L v and L h and the optical center of the projector O p is the intersection of these lines. The point O p and the direction vectors for L v and L h are given by calibrating projector 12 and camera 14. Intersections of the vertical and horizontal patterns projected onto the surface of the target scene are extracted from images captured by the camera 14. Here, these points are referred to as captured intersections. Connectivity between the captured intersections is extracted by image processing. The pattern connecting these intersections can be determined to be a vertical or horizontal pattern, so captured intersections are related in one of two types of relationships, being "on the same VPP" or "on the same HPP". However, the correspondence from each VPP containing the captured intersections to a particular CVPP is assumed to be unknown. This type of VPPs with unknown correspondences is referred to as unknown VPPs (UVPPs) (FIG. 4). The term unknown HPP (UHPP) is similarly defined. The goal of the problem is deciding correspondences from all the UVPPs and UHPPs to CVPP or CHPP (the decision is called, in other words, identifying UVPPs and UHPPs). Since UVPPs have one-to-one correspondences with detected vertical patterns and the CVPPs are known 3D planes, the 3D positions of points on a detected vertical pattern can be obtained by light sectioning method using correspondences between UVPPs and CVPPs. If a projected line of a single CVPP becomes discontinuous on the image because of occlusions or other reasons, it can be observed as multiple vertical patterns. In this case, multiple UVPPs correspond to a single CVPP. The same things happen for UHPPs and CHPPs.

Figure 2:
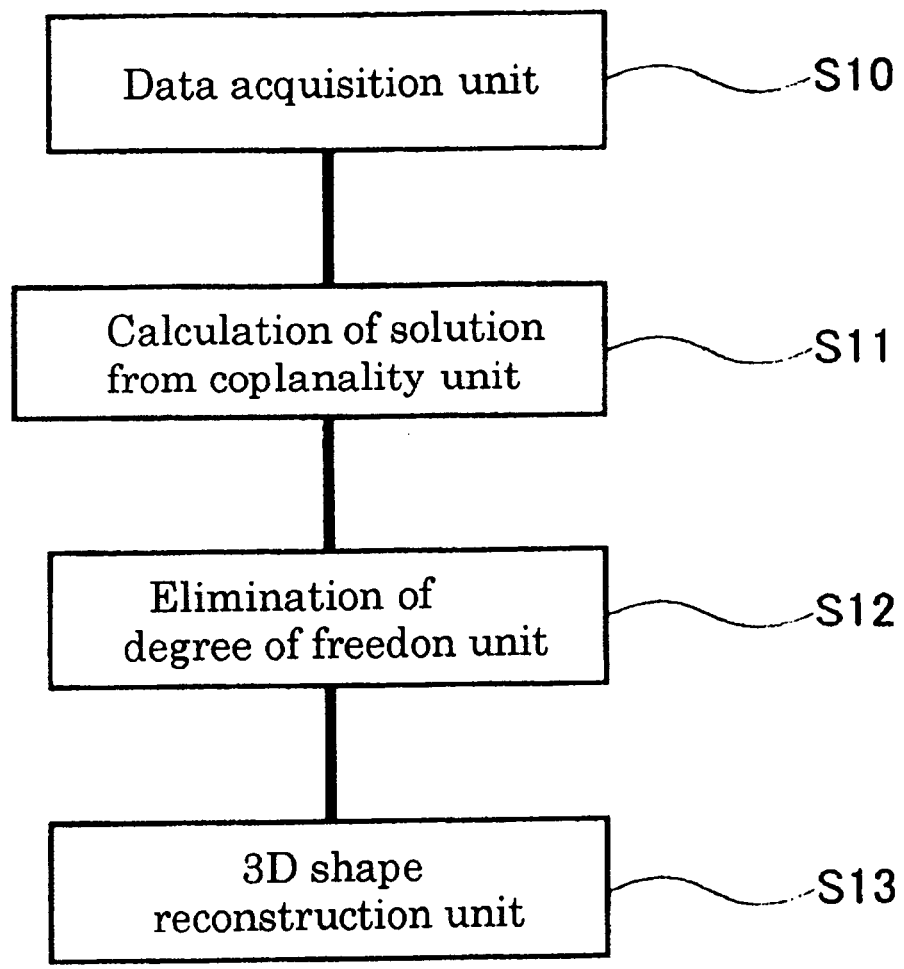
[FIG. 2] The figure illustrates the image processing apparatus of the invention.

In the following, a method of image processing is described in detail. Referring to FIG. 2, an image processing method according to the embodiment includes: a step S10 to obtain data which is required for reconstruction of 3D shape of object, step S11 to calculate a solution by using coplanarity constraint existing in UVPP or UHPP, step S12 to eliminate a degree of freedom of the solution by matching between set of UVPP or UHPP and set of CVPP or CHPP, and step S13 to reconstruct 3D shape from the calculated solution. In the invention, a degree of freedom of indeterminacy of the solution calculated at step S11 is one, therefore, all the UVPP and UHPP can be determined by deciding one parameter in step S12. Such a process can be done by, for example, one dimensional search to minimize the sum of matching error between two planes.

Hereinafter, these steps are described in detail.

Step S10

In the step, a data that is necessary for 3D reconstruction of object 18 in FIG. 1 is acquired using image processing unit 10. More specifically, light of patterns that includes multiple patterns that are crossed at right angles is projected to object 18. Here, as an example shown in FIG. 7(A), light of patterns that are composed of vertical patterns and horizontal patterns that are crossed at right angles is projected from projector 12. Then, the reflected light from the object is captured by camera 14. Information from 2D images captured by camera 14 is an input to image processing method 16. By performing the image processing to an input 2D image of image processing method 16, 2D positions of intersection points between patterns are extracted by means of image processing. In FIG. 7(B), examples of detected patterns or detected intersection points are shown.

Step S11

In the step, a method for obtaining constraint equations about UVPPs and UHPPs from intersection points that are captured by the camera, and for obtaining solutions of the planes (first solution) except for one degree of freedom. First, the symbols for referring relevant planes (CVPP, CHPP, UVPP, UHPP) are defined.

Let the CVPPs obtained by calibration be represented as $V_1, V_2, \ldots, V_M$, CHPPs be represented as $H_1, H_2, \ldots, H_N$. Also, let the UVPPs and UHPPs obtained from the captured image be represented as $v_1, v_2, \ldots, v_m$ and $h_1, h_2, \ldots, h_n$, respectively.

Suppose that the intersection between $v_k$ and $h_l$ is captured and its position on the image in the coordinates of the normalized camera is $u_{k,l} = [s_{k,l}, t_{k,l}]^T$. The planes $v_k$ and $h_l$ can be represented by

[Equation 1]

$$v_k^T x = -1, \quad h_l^T x = -1. \tag{1}$$

respectively, where 3D vectors $v_k$ and $h_k$ are vectors of plane parameters and x is a point on each plane. Let the 3D position of the intersection $u_{k,l}$ be $x_{k,l}$, then $x_{k,l}$ can be represented using the coordinates of the image as

[Equation 2]

$$x_{k,l} = \gamma [u_{k,l}^T\ 1]^T \qquad (2)$$

By substituting $x=x_{k,l}$ into equation (1), and eliminating $x_{k,l}$ and $\gamma$ from equations (1) and (2),

[Equation 3]

$$[u_{k,l}^T\ 1](v_k - h_l) = 0 \qquad (3)$$

is obtained. This equation is a linear equation with variables $v_k$ and $h_l$. Accumulated equations for all the captured intersection points become simultaneous linear equations with variables $v_1, \ldots, v_m, h_1, \ldots, h_n$. Let a matrix representation of these equations be $Aq=0$, where $q=[v_1^T, \ldots, v_m^T, h_1^T, \ldots h_n^T]^T$.

Since only the substitution $(v_k - h_l)$ appears in the equation (3), for a solution $q=[v_1^T, \ldots, v_m^T, h_1^T, \ldots, h_n^T]^T$ of $Aq=0$, a vector that is multiplication of $q$ by a scalar, i.e., $s\ q = [s v_1^T, \ldots, s v_m^T, s h_1^T, \ldots, s h_n^T]^T$, is also a solution. Similarly, a vector that is addition of $q$ and a constant vector that is concatenation of a constant 3D vector $c$, i.e., $q+[c^T, c^T, \ldots, c^T]^T = [v_1^T + c^T, \ldots, v_m^T + c^T, h_1^T + c^T, \ldots, h_n^T + c^T]^T$ is also a solution. Using this fact, the general solution of $Aq=0$, can be written as

[Equation 4]

$$v_k = s v'_k + c,\ h_l = s h'_l + c \qquad (4)$$

where $q' = [v_1'^T, \ldots, v_m'^T, h_1'^T, \ldots, v_n'^T]^T$ is a special solution of $Aq=0$.

In this invention, there are assumed conditions that all the UVPPs include line $L_v$ and all the UHPPs include line $L_h$. Also, $L_v$ and $L_h$ intersects at point $O_p$. From these conditions, there are constraints between arbitrary variables $s$ and $c$ of equation (4), and the freedoms of the solution is reduced. In the following, how to obtain general solution considering these conditions is described. The plane that includes both $L_v$ and $L_h$ is referred to as the projector focal plane (PFP) and its plane parameter is described as $p$. Let the direction vectors of the line $L_v$ and $L_h$ be represented as $l_v$ and $l_h$ respectively. Also, let the 3D coordinate vector of the optical center $O_p$ of the projector be $o_p$. UVPPs contain the line $L_v$, UHPPs contain the line $L_h$, and all the planes contain the point $O_p$. Thus,

[Equation 5]

$$l_v^T v_k = 0,\ l_h^T h_l = 0,\ o_p^T v_k = -1,\ o_p^T h_l = -1 \qquad (5)$$

are obtained. In addition, we assume that the special solution $q'$ defined above fulfills the same conditions. This means that

[Equation 6]

$$l_v^T v'_k = 0,\ l_h^T h'_l = 0,\ o_p^T v'_k = -1,\ o_p^T h'_l = -1 \qquad (6)$$

holds. In addition, since PFP include line $L_v$, $L_h$ and point $O_p$,

[Equation 7]

$$l_v^T p = 0,\ l_h^T p = 0,\ o_p^T p = -1,\ o_p^T p = -1 \qquad (7)$$

holds. From equations (5), (6) and (7)

[Equation 8]

$$l_v^T(v_k - p) = 0,\ l_h^T(h_l - p) = 0,\ o_p^T(v_k - p) = 0,\ o_p^T(h_l - p) = 0,$$
$$l_v^T(v'_k - p) = 0,\ l_h^T(h'_l - p) = 0,\ o_p^T(v'_k - p) = 0,\ o_p^T(h'_l - p) = 0 \qquad (8)$$

are obtained. From these equations, both $v_k - p$ and $v'_k - p$ are perpendicular to both $l_v$ and $o_p$. Since $l_v$ and $o_p$ are not parallel in general, the vector that is perpendicular to these two vectors can be determined uniquely except for the scaling. Thus,

[Equation 9]

$$(v_k - p) = s(v'_k - p) \qquad (9)$$

is obtained. Similarly,

[Equation 10]

$$(h_k - p) = s(h'_k - p) \qquad (10)$$

holds. From equation (9), (10), the general solution of equations (3) and (5) is

[Equation 11]

$$v_k = s(v'_k - p) + p,\ h_l = s(h'_l - p) + p \qquad (11)$$

As already described, $[v_1'^T, \ldots, v_m'^T, h_1'^T, \ldots, v_n'^T]^T$ is a special solution, and $p$ is a parameter vector of plane PFP. Because indeterminacy of the general solution (4) is reduced by conditions $L_v$ and $L_h$, the remaining indeterminacy of equation (11) is only one degree of freedom of scalar $s$.

Figure 5:
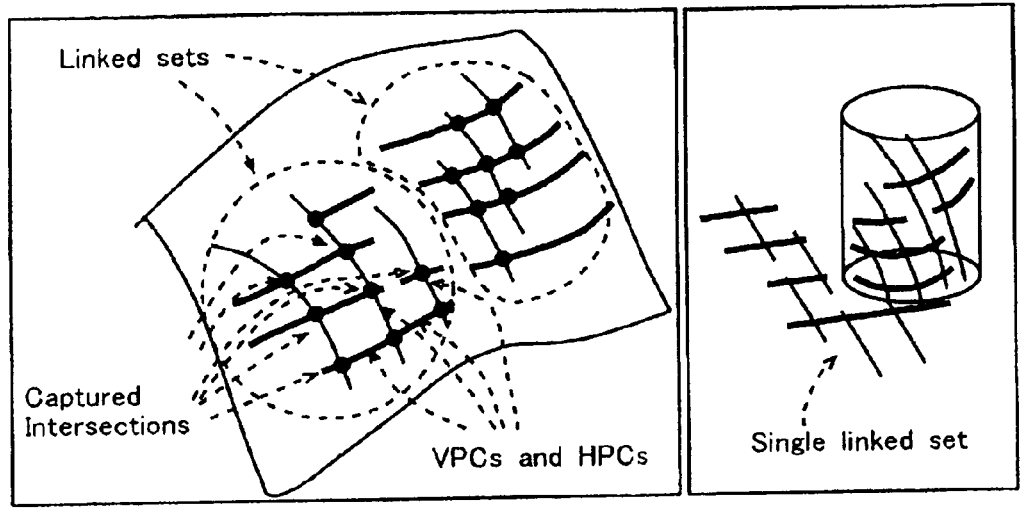
[FIG. 5] The figure illustrates the image processing method of the invention and set of planes of the pattern irradiated by projector.

Equation (11) means that, from images of intersection points between vertical patterns and horizontal patterns, the positions of their corresponding planes (i.e. UVPPs and UHPPs) can be solved except for one degree of freedom. Obtaining this representation of solution needs requirements such as follows. We define that, if an intersection point between two curves of a UVPP and a UHPP is detected, the two planes are connected. We also define that, if planes a and b are connected and planes b and c are connected in the above meaning, then planes a and c are connected. For a set of UVPPs and UHPPs, and an arbitrary element of the set is connected to all the other elements, then the set is called a connected set. FIG. 5 shows an example of a connected set. Under these definitions, if a set of UVPPs and UHPPs are a connected set, then the solutions of the positions of all the planes in the set can be solved by equation (11).

Intuitively, this can be proved as the following: With respect to a single UVPP $v_f$, the positional indeterminacy is one degree of freedom, since $v_f$ include a line $L_v$. Here, we set the unsettled single parameter of $v_f$ to an assumed value, and then, consider a UHPP $h_g$ that has an intersection point with $v_f$. By deciding the position of $v_f$, the position of $h_g$ is also fixed because the 3D position of the intersection point can be calculated and $h_g$ includes line $L_h$. Similarly, if a plane is fixed, then, other planes that share intersection points to the fixed plane can also be decided. By repeating this process, we can fix all the planes for an entire connected set. In this case, the indeterminacy is only one degree of freedom for the first plane. The equation (11) expresses this form of solution. However, if a set of UVPPs and UHPPs is not a connected set, the degree of freedoms of the whole solution is equal to or more than 2, since there are no constraints between planes that are not included in a single connected set. Thus, a necessary and sufficient condition for the set of all the planes to be expressed by equation (11) is that the set is a connected set.

In this invention, the set of UVPPs and UHPPs are assumed to be a connected set, if multiple connected sets are obtained from the target scene, it is sufficient to apply the invention for each of the connected sets. Thus, this does not reduce generality of the invention. Dividing UVPPs and UHPPs into connected sets can be easily implemented using labeling process applied to the images. Another efficient method to achieve the same result is examining the connection relationships of a graph that are composed of detected vertical and horizontal patterns and captured intersection points.

Depending on the supposed applications, the solution with remaining one degree of freedom obtained in step 11 can be sufficiently useful. For example, in the case that the focal length of the projector light source is long (thus, it is nearly a parallel light source), the remaining parameter of the solution with one degree of freedom may be decided arbitrary because the distortion of the shape becomes relatively small. Thus, in this case, for limited use in which the shape is rendered with shading, the output of step S10 may be a sufficiently useful result. In particular, if it is rendered to only a 2D display, the rendered image seems natural enough, and can be used for movies, games, or digital archives as it is. Thus, output of step S11 can be a practical result.

Step S12

In this step, matching is processed between the solution obtained in the previous step and the set of CVPPs and CHPPs, and the result is correspondences between UVPPs and CVPPs, or correspondences between UHPPs and CHPPs. This means that a parameter of the solution of the previous step is decided such that the solution and the set of CVPPs and CHPPs coincide. The solution of the previous step of UVPPs and UHPPs is obtained from only the captured intersection points, and information of CVPPs and CHPPs is not used. Since the degree of freedom of the solution is one, matching can be processed efficiently using 1D search, and a solution with no remaining degrees of freedom (second solution) can be obtained.

First, we define expressions for correspondence between UVPPs and CVPPs. If the k-th UVPP $v_k$ corresponds to the i-th CVPP $V_i$, it can be written as $v_k \to V_i$. This means that $v_k$ is identified as $V_i$.

Explanation of specific pattern matching processing is as follows. First, an arbitrary UVPP is selected. For example, we suppose that $v_{10}$ is selected. Then, $v_{10}$ corresponds to CVPP $V_1$, and the positions of all the UVPPs and UHPPs (i.e. $v_1, \ldots, v_m, h_1, \ldots, h_n$) based on the correspondence. In this process, it is evaluated that if the set of obtained positions of UVPPs and UHPPs ($v_1, \ldots v_m, h_1, \ldots, h_n$) matches to set of CVPPs and CHPPs ($V_1, \ldots, V_M, H_1, \ldots, H_N$).

Then, the corresponding plane $v_{10}$ is changed to $V_2, V_3 \ldots$ and each set of plane positions of UVPPs and UHPPs obtained form the correspondences is evaluated if it matches the set of UVPPs and CHPPs.

Based on the positions of UVPPs and HUPPs that is evaluated as the best matching to the set of CVPPs and CHPPs, its correspondences between UVPPs and CVPPs, and its correspondences between UHPPs and CHPPs are output as the solution.

Evaluation method for matching is described below. Form (11) has an indeterminacy of parameter s. The parameter can be calculated as follows by assuming a specific correspondence between a UVPP and CVPP. By assuming the correspondence from the k'-th UVPP to the i'-th CVPP (i.e. $v_{k'} \to V_{i'}$)

[Equation 12]

$$V_{i'} = v_{k'} = s(v'_{k'} - p) \tag{12}$$

holds, where $V_{i'}$ is the parameter vector of the CVPP $V_{i'}$. From this form, s can be calculated by

[Equation 13]

$$s = \|V_{i'} - p\| / \|v'_{k'} - p\| \tag{13}$$

From the calculated s, all the UVPPs and UHPPs under an assumption of $vk' \to V_i$ can be calculated.

Let this s of the form (13) be denoted as s(k', i'). Then, $v_k$ and $h_l$ given the correspondence $v_{k'} \to V_{i'}$, which we refer to as $v_k$ (k', i') and $h_l$ (k', i'), respectively, can be calculated by

[Equation 14]

$$v_k(k', i') = s(k', i')(v_k - p) + p, \; h_l(k', i') = s(k', i')(h_l - p) + p \tag{14}$$

The next step is comparing the calculated UVPPs (or UHPPs) with the CVPPs (or CHPPs). For each UVPP, the difference between the UVPP and the nearest CHPP is calculated as an error. Then, we can define a match estimation for an assumed correspondence $v_{k'} \to V_{i'}$ as the sum of squared errors for all the UVPPs (the smaller the squared errors are, the better matched the plane sets are). By searching for the minimum of the error function, we can find the optimum correspondence and solve the ambiguity.

The comparisons are executed between UVPPs $v_k$ (k', i'), (k=1, ..., m) and CVPPs $V_i$, (i=1, ..., M), and also between UHPPs $h_l$(k', i'),(l=1, ..., n) and CHPPs $H_j$, (j=1, ..., N). In this paper, comparison is done based on the squared angles between the planes. More specifically, the error function is defined as

[Equation 15]

$$E_{k'}(i') \equiv \sum_{k=1}^{m} \min_{i=1,\ldots,M} \{D(v_k(k', i'), V_i)\}^2 + \sum_{l=1}^{n} \min_{j=1,\ldots,N} \{D(h_l(k', i'), H_j)\}^2. \tag{15}$$

where D means the angle between two planes which can be defined as

[Equation 16]

$$D(v_k, V_i) \equiv \arccos((v_k \cdot V_i)/(\|v_k\| \|V_i\|)) \tag{16}$$

Using these forms,

[Equation 17]

$$i'_{min} \equiv \arg\min_{i'} E_{k'}(i') \tag{17}$$

is finally searched, and the set of planes $v_k$ (k', $i'_{min}$), (k=1, 2, ..., m) and $h_l$ (k', $i'_{min}$), (l=1, 2, ..., n) is the solution.

There are another method for comparing the set of calculated UVPPs and UHPPs and the set of CVPPs and CHPPs. For example, one can compare the set of intersection lines between UVPPs and UHPPs (there are multiple intersection lines because there are multiple UVPPs and UHPPs) with the set of intersection lines between CVPPs and CHPPs. Let us call the former set by IUPP (Intersections between Uncalibrated Projector Planes), and let us call the latter set by ICPP (Intersections between Calibrated Projector Planes). As a criteria to measure the match, for each h in IUPP, elements in ICPP is searched, and g in ICPP such that d(g,h) becomes the minimum, where d(g,h) means a difference of angle between direction vectors of line g and line h. The same process is applied for all the h, and the error function is defined as the sum of squares of the angle differences d(g,h). The parameter such that the error function is the minimum can be obtained, as similarly to step S12.

Other methods can be applied if the method is about comparing the detected patterns and the known patterns. For example, a case that a vertical pattern detected as a boundary of a vertical band-like pattern can be considered. In this case, the vertical pattern of a certain UVPP and the corresponding CVPP should be the same about whether the pattern is the left side boundary or the right side. In other words, UVPP of the right-side boundary should be corresponded to CVPP of the right-side boundary. This can be reflected to error function that estimates the matching, or can be used for the search process of the matching parameter. In addition, if there is a method for classifying some intersection points form others, it can be used to estimate the matching. For example, some intersection points can be marked by markers such as circles in the used pattern, then, the matching of the circled intersection points can be used for estimate matching between the set of UVPPs and UHPPs and the set of CVPPs and CHPPs.

Step S13

Figure 6:
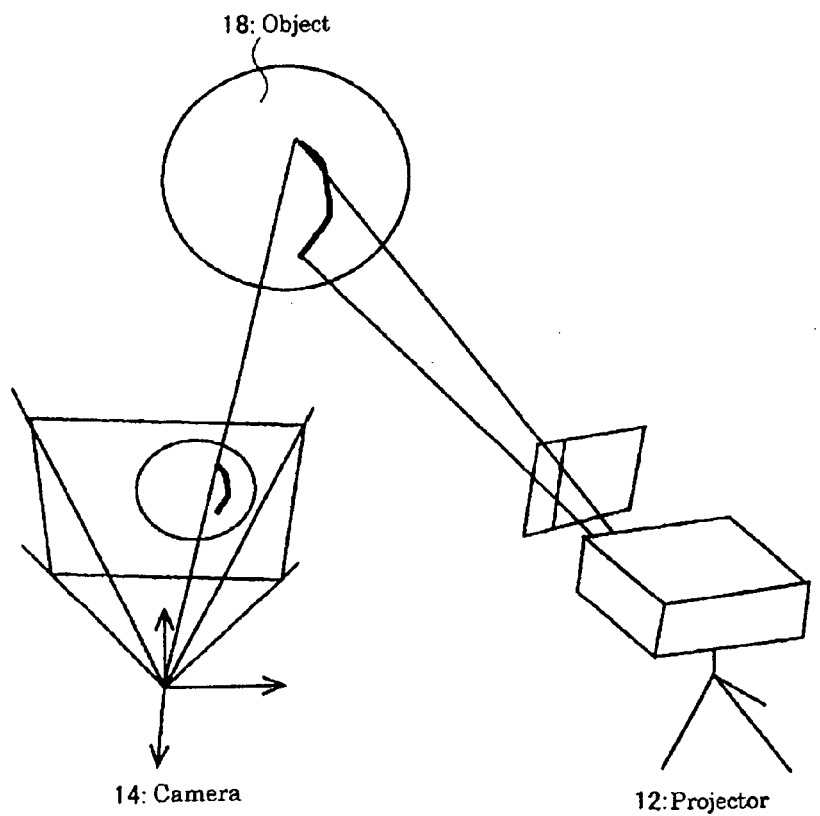
[FIG. 6] The figure illustrates the image processing method of the invention and the method of 3D shape reconstruction.

In the step, since all the UVPPs are identified in the previous processes, the shape is reconstructed by light sectioning method. More specifically, as shown in FIG. 6, the 3D points on object 18 are calculated as intersection points between the plane parameter and the line of sight that includes both detected edges and the optical center of camera 14.

By processing the previous steps, the 3D shape of the object captured by the camera can be reconstructed.

<Third Embodiment of the Present Invention: Positional Relationship between the Camera and the Projector>

One can improve the precision of the measurement by precisely calibrating the positional relationship between the camera and the projector before the measurement. One method to do that is calibrating parameters using calibration objects. On the other hand, processing calibration before measurement can be a burden. Thus, at the measurement process, processing a self-calibration by projecting a certain set of patterns onto static objects can be useful. This method is described in, for example, Ryo Furukawa, Hiroshi Kawasaki, "Dense 3D Reconstruction with an Uncalibrated Stereo System using Coded Structured Light," IEEE Computer Society Conference on Computer Vision and Pattern Recognition (CVPR'05) Workshop on Projector-Camera Systems, p. 107, 2005.

<Fourth Embodiment: The Positional Configuration of the Projected Patterns>

Next, patterns projected from projector 12 are described.

The positional configuration of the projected patterns (CVPPs and CHPPs) affects stability of the search expressed as equation (17). Let us suppose that the true correspondences between planes to be $v_1^T \rightarrow V_l, \ldots, v_m^T \rightarrow V_m, h_l \rightarrow H_l, \ldots, h_n \rightarrow H_n$. If there are no errors in the solution, $V_l = v_l, \ldots, V_m = v_m, H_l = h_l \ldots, H_n = h_n$ for the true s of equation (11). However, let us assume that there exist a value s' that is different from the true s of equation (11), that the value s' produces UVPPs and UHPPs($v_l, \ldots, v_m, h_l, \ldots, h_n$) at different positions from their true positions, and that there exists q and r such that $V_q = v_k, (k \neq q), H_r = h_i, (i \neq r)$ for arbitrary k and i. Then, the value s' cannot be discriminated from the true value s. Thus the unique solution cannot be obtained.

Figure 7:
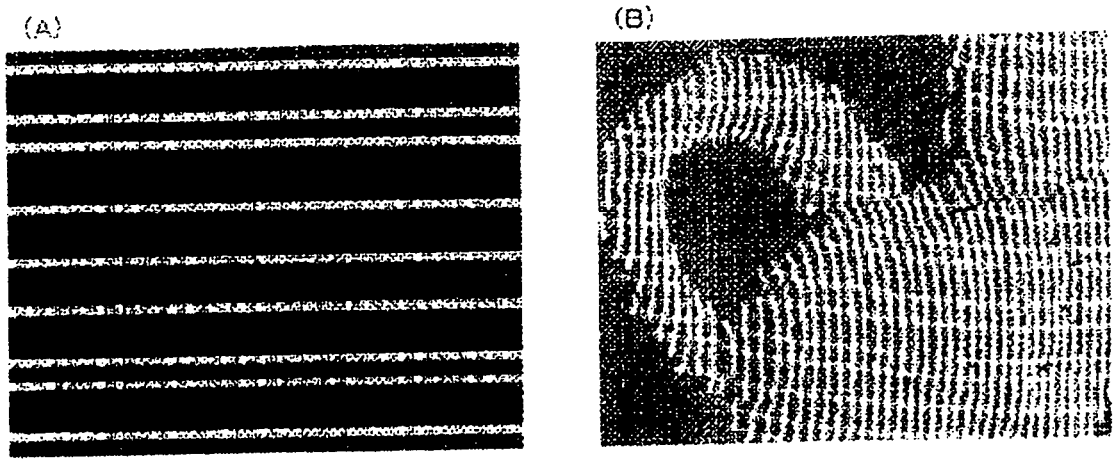
[FIG. 7] The figure illustrates the image processing method of the invention and, (A) illustrates the image of irradiated pattern and (B) illustrates the extracted linear pattern.

Generally, this kind of situation does not occur. However, in cases that CVPPs and CHPPs are arranged regularly, the evaluation function does not change much even if all the correspondences are changed by one position and the solution tend to become unstable. One method to prevent this is arranging CVPP and CHPP at irregular intervals on the image plane of the projector. This method makes the plane positions of the sets Vq and Hr irregular, and prevents the abovementioned condition. In actual cases, it is not required that both of the sets are irregular, and the instability can suppressed by arranging CHPPs at irregular intervals, and arranging CVPPs regularly (with uniform intervals) and denser than CHPPs. The advantage of this configuration is that the search stability is achieved by irregularity of CHPPs, and that the density of resulting points can be increased by dense CVPPs. An example of such patterns is shown in FIG. 7. Even if the arrangement of CHPP is based on some rules rather than irregular intervals, the stability can be increased by using non-uniform spacing. This is another solution.

In the invention, not like a common one-shot scanning technique which identifies each local pattern, a pattern is not required to be encoded like deBruijn sequence, and a single color is sufficient. Since a single color is sufficient, the technique is less affected by texture color and a stable detection is possible by simple image processing. Further, it is not spatially encoded, one pixel width of pattern is sufficient and very dense shape reconstruction can be achieved.

Figure 8:
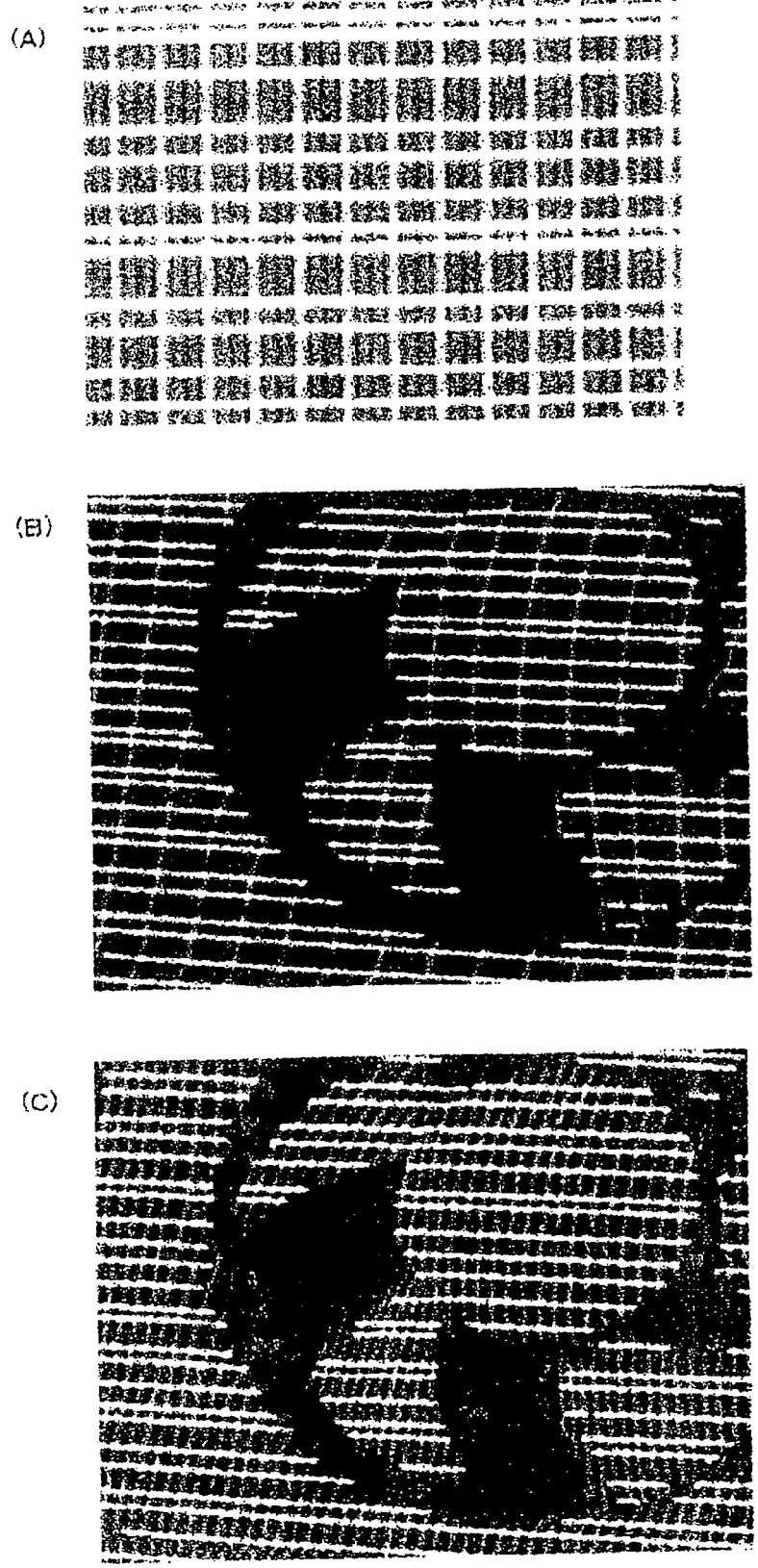
[FIG. 8] The figure illustrates the image processing method of the invention and, (A) illustrates the pattern where both sparse and dense pattern are used for vertical direction, (B) illustrates detected sparse pattern and (C) illustrates detected dense pattern.

In addition, in this invention, it is sufficient to classify each of the single-colored patterns into classes of vertical patterns or horizontal patterns. Thus, it is robust against textures. However, there remain problems about shapes of the target. For example, in case that the target shape is a cylinder, where normal directions at the front region and the side region are different largely, with a pattern of uniform frequency may result in detection failure, because the appearances of the pattern are compressed at the side regions. In this invention, adding patterns with different special frequency can solve this problem. To achieve the solution by using projectors and cameras that are available on the market, we use only three colors of RGB. One color is used for the horizontal patterns that are single-colored, irregular and coarse, and the other two colors are used for regular patterns with coarse and dense intervals. An actual example of such pattern is shown in FIG. 8(A). The detection result of vertical and horizontal patterns using this pattern is shown in FIG. 8(B) and FIG. 8(C). One can see that coarse grids and dense grids are detected respectively. In the following explanation, this type of pattern configuration and processing is called coarse-to-fine.

For multiple patterns used for coarse-to-fine, different patterns can be parallel patterns with different density, or they can be completely independent patterns.

To further improve coarse-to-fine method, one can increase the number of patterns with different densities. Even in this case, since the invention is used for only increasing spatial frequencies, classifying 10 patterns are enough for a camera with 1024 (=10 bits) pixel resolution in the worst case (the case where the highest number of patterns are needed). Thus, it is fundamentally different from the previous methods that encode information into patterns spatially. Classifying 10 patterns can be easily achieved by using methods such as narrow band-pass filters.

For reconstruction, results of FIG. 8(B) and FIG. 8(C) can be reconstructed independently and the resulting shapes can be merged. For methods for merging, a simple way that is easy to implement is taking union of the results. More precise method is improving coherency of lines shared by dense and coarse patterns based on statistical methods.

As another method, instead of reconstructing two patterns independently, one can reconstruct shapes using all the patterns of horizontal pattern, coarse vertical pattern, and dense vertical pattern. If the coarse vertical pattern and the dense vertical pattern are parallel as shown in FIG. 8(A), all the patterns of coarse vertical pattern and the dense vertical pattern can be regarded as a set of vertical patterns.

To increase the precision of the solution, in addition to the basic grid-like pattern, one can add other line-based patterns. The additional line patterns can be processed similarly as the abovementioned method: they can be represented as plane parameters written in the form of equation 1, linear equations are constructed for each of the intersection points with all the patterns, and, since a plane corresponding to each of the patterns includes a line that is decided from the direction of the pattern, simultaneous linear equations can be generated using methods that are similar to equations 9, 10. By solving the equations, one can reconstruct shapes for patterns with a set of lines whose directions are more than three kinds of directions. Using this method, one can solve the case of non-parallel sets of dense and coarse vertical lines (not like the example of FIG. 8(A)) by simply solving one set of equations).

<Fifth Embodiment of the Present Invention: Using Means for Projecting Parallel Planes>

In the second embodiment, we assume that the set of planes of the vertical patterns (or horizontal patterns) is a set of planes that share a single line. Instead of this assumption, we can also use parallel planes. In this case, the condition that the planes share a single line is replaced by the condition that "the planes share a single line at infinity". Then, the lines $L_v$ and $L_h$ in the second embodiment share a single point at infinity $O_p$. By this consideration, equation $O_p^T v_k = -1$ in equation (5) can be replaced by $O_p^T v_k = 0$. Similarly, by replacing the right side value $-1$ of equations (5), (6), and (7) by 0, we can obtain constraints that parallel planes comply. By using these constraints, solutions with one degree of freedom can be obtained, similarly as the second embodiment.

A real system can be achieved by arranging line-laser light sources in parallel. Using this configuration, one can get the pattern light with the same intervals even if the object moves far away from the light source. Thus, the light source can be placed far away from the target, and can be useful for 3D measurement.

<Sixth Embodiment: Detection Algorithm of Patterns>

If the vertical and horizontal patterns are colored in red and blue, respectively, these lines are divided by using red and blue planes of the captured image. For line detection method, using simple thresholding is one method. However, since the intensity of the line can be varied by distance from the light source to the surface, or by difference of normal directions of the surface points, it is difficult to achieve precise line detection for all the image by simple thresholding. In this case, using edge filters such as canny filters is a method to achieve stable result. However, edge filters may be affected by erroneously detected edges of textures or of boundaries of objects. One method to avoid this is dividing the whole image into small blocks, a threshold value is decided for each of the blocks, and detecting lines for each block by thresolding.

One can also arrange the projector and the camera, by keeping the directions of the devices at parallel positions and by rotating each of the camera and the projector by 45 degrees. In this case, vertical and horizontal projected patterns that are crossed by right angles can be detected, even in the camera coordinates, as vertical and horizontal patterns that are crossed by right angles. Thus, in scanning the captured image in vertical or horizontal directions, a same pattern is not scanned twice. Using this configuration, and by using algorithm of detecting peaks on the scanlines, problems of simple shareholding, problems of textures, and problems of edges of occluding boundaries can be resolved.

<Seventh Embodiment: Reducing the Number of Equations>

In the abovementioned second embodiment, the number of variables in the equations is $3(m+n)$ where m is the number of UVPPs and n is the number of UHPPs. By reducing the number of variables, the time for processing the data can be much reduced. By reducing the variables using the following method, the time for calculating the solution that include degrees of freedom can be reduced by 1/100000, resulting in an efficient 3D reconstruction.

In the following, by using property of planes that all the planes share a single line, planes are represented by a single parameter. Thus, the number of variables is reduced by 1/3, and the processing time for reconstructing 3D shapes is reduced.

Specifically, we assume that both $v_k$ and $h_l$ are planes that includes $o_p$ (this plane is PFP and expressed as p), and the two planes are perpendicular to $l_v$ and $l_h$ respectively. By defining

[Equation 18]

$$\bar{v} = l_v \times o_p,\ \bar{h} = l_h \times o_p \qquad (18),$$

we can express

[Equation 19]

$$v_k = \eta_k \bar{v} + p,\ h_l = \rho_l \bar{h} + p \qquad (19)$$

In expression (19), $v_k$ and $h_l$ are expressed by single parameters ($\eta_k$, $\rho_l$). Thus from equation (3),

[Equation 20]

$$\tilde{u}_{k,l}^T \{(\eta_k \bar{v} + p) - (\rho_l \bar{h} + p)\} = 0 \Leftrightarrow (\tilde{u}_{k,l}^T \bar{v})\eta_k - (\tilde{u}_{k,l}^T \bar{h})\rho_l = 0 \qquad (20)$$

where $\tilde{u}_{k,l}$ is defined as $\tilde{u}_{k,l} \equiv [u_{k,l}^T\ 1]^T$

If the i-th intersection point is one between $v_k$ and $h_l$, then, we define $\alpha(i) \equiv k$, $\beta(i) \equiv l$. Then, the equation from the i-th intersection points can be written as the following:

[Equation 21]

$$(\tilde{u}_i^T \bar{v})\eta_{\alpha(i)} - (\tilde{u}_i^T \bar{h})\rho_{\beta(i)} = 0 \qquad (21)$$

where $\tilde{u}_{\alpha(i),\beta(i)} \equiv \tilde{u}_i$

By defining m to be the number of UVPPs, n to be the number of UVPPs, K to be the number of intersection points, this condition can be written as the following: using definitions

[Equation 22]

$$\phi(i) \equiv (\tilde{u}_i^T \bar{v}),\ \psi(i) \equiv (\tilde{u}_i^T \bar{h}) \qquad (22)$$

[Equation 23]

$$P \equiv \begin{matrix} & \begin{matrix} 1 & \dots & \alpha(i) & \dots & \beta(i) & \dots & m+n \end{matrix} \\ \begin{matrix} 1 \\ \vdots \\ i \\ \vdots \\ K \end{matrix} & \begin{pmatrix} \dots & \dots & \dots & \dots & \dots \\ \dots & \dots & \dots & \dots & \dots \\ \dots & \phi(i) & \dots & -\psi(i) & \dots \\ \dots & \dots & \dots & \dots & \dots \\ \dots & \dots & \dots & \dots & \dots \end{pmatrix} \end{matrix}, \qquad (23)$$

[Equation 24]

$$q = [\eta_1, \dots, \eta_m, \rho_1, \dots, \rho_n]^T \qquad (24)$$

then, the conditions can be expressed as a homogeneous linear equation written as

[Equation 25]

$$Pq = 0 \qquad (25)$$

This equation expresses conditions of equation (3) with additional conditions of equation (19) that means UVPPs include $L_v$ and UHPPs include $L_h$. Thus, the abovementioned general solution can be obtained by solving this equation. Because the variable vector q of this equation is (m+n)-dimensional vector, this method reduces $3(m+n)$ variables to $(m+n)$ variables.

Next, a method for reducing the number of variables to the number of horizontal planes is explained. The reduction is achieved by converting the abovementioned equations to equations with variables of parameters of only the horizontal planes (UHPPs).

First, we solve equation (25) by minimizing the norm of the left side of the equation considering noise. By defining the squared norm of the left side to be $Ep \equiv \|Pq\|^2$, then the following equation holds:

[Equation 26]

$$E_p = \sum_{i}^{N_p} \{\phi(i)\eta_{\alpha(i)} - \psi(i)\rho_{\beta(i)}\}^2 \quad (26)$$

This equation is partially differentiated with respect to $\eta_j$. By defining $\alpha-1(j) \equiv \{k|\alpha(k)=j\}$, the following equation holds:

[Equation 27]

$$\begin{aligned}\frac{\partial E_p}{\partial \eta_j} &= \sum_{k \in \alpha^{-1}(j)} \frac{\partial}{\partial \eta_j}\{\phi(k)\eta_j - \psi(k)\rho_{\beta(k)}\}^2 \\ &= \sum_{k \in \alpha^{-1}(j)} 2\phi(k)\{\phi(k)\eta_j - \psi(k)\rho_{\beta(k)}\} \\ &= 2\eta_j \sum_{k \in \alpha^{-1}(j)} \{\phi(k)\}^2 - 2 \sum_{k \in \alpha^{-1}(j)} \phi(k)\psi(k)\rho_{\beta(k)}\end{aligned} \quad (27)$$

To minimize $E_p$, we solve $\partial E_p/\partial \rho_j = 0$. Since

[Equation 28]

$$\eta_j \sum_{k \in \alpha^{-1}(j)} \{\phi(k)\}^2 = \sum_{k \in \alpha^{-1}(j)} \phi(k)\psi(k)\rho_{\beta(k)}, \quad (28)$$

we obtain the following equation:

[Equation 29]

$$\eta_j = \frac{\sum_{k \in \alpha^{-1}(j)} \phi(k)\psi(k)\rho_{\beta(k)}}{\sum_{k \in \alpha^{-1}(j)} \{\phi(k)\}^2} \quad (29)$$

Thus, $\rho_j$ can be expressed as a linear combination of $\eta_k$. This can be expressed as

[Equation 30]

$$\bar{\eta} = T\bar{\rho} \quad (30)$$

where we use the following definitions:

[Equation 31]

$$\omega(j) \equiv 1 \Big/ \sum_{k \in \alpha^{-1}(j)} \{\phi(k)\}^2, \quad (31)$$

[Equation 32]

$$\chi(k) \equiv \phi(k)\psi(k), \quad (32)$$

[Equation 33]

$$T \equiv \begin{pmatrix} \cdots & k_1 & \cdots & k_2 & \cdots \\ \vdots & \cdots & \cdots & \cdots & \cdots \\ j & \cdots & w(j)\chi(k_1) & \cdots & \omega(j)\chi(k_2) & \cdots \\ \vdots & \cdots & \cdots & \cdots & \cdots \end{pmatrix}, \quad (33)$$

[Equation 34]

$$\bar{\eta} \equiv [\eta_1, \ldots, \eta_m]^\top, \quad (34)$$

[Equation 35]

$$\bar{\rho} \equiv [\rho_1, \ldots, \rho_n]^\top \quad (35)$$

In definition of T, the column indexes $k_1, k_2, \ldots$ are elements of $\alpha^{-1}(j)$, which is the set of indexes of all the UHPPs that have intersection points with the j-th UVPP. Then, from

[Equation 36]

$$q = \begin{bmatrix} \bar{\eta} \\ \bar{\rho} \end{bmatrix} = \begin{bmatrix} T \\ I \end{bmatrix} \bar{\rho} \quad (36)$$

and by defining

[Equation 37]

$$R \equiv \begin{bmatrix} T \\ I \end{bmatrix} \quad (37)$$

then, minimizing $\|Pq\|^2$ is equivalent to minimizing

[Equation 38]

$$\|Pq\|^2 = \|PRq\|^2 = q^T(R^T P^T PR)q \quad (38)$$

The minimization of this equation is equivalent to solving the equation

[Equation 39]

$$PRq = 0 \quad (39)$$

by considering errors by minimizing the sum of squared errors. This can be solved by calculating the eigenvector of matrix $R^T P^T PR^T$ that is associated to the minimum Eigen value. $R^T P^T PR^T$ is a n×n matrix. If we use dense vertical patterns and coarse horizontal patterns, n (the number of UHPPs) is much smaller than m (the number of UVPPs). In this case, the above problem can be solved much efficiently than solving the problem of minimizing $\|Pq\|^2$ with respect to q.

Figure 9:
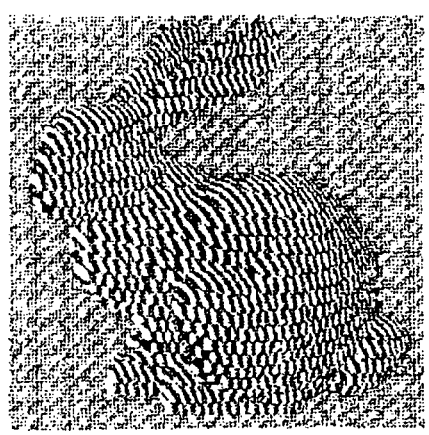
[FIG. 9] The figure illustrates the image processing method of the invention and, (A) illustrates the input images by regular pattern, (B) illustrates the input images by random pattern and (C) illustrates results of image processing using random pattern.
Figure 9:
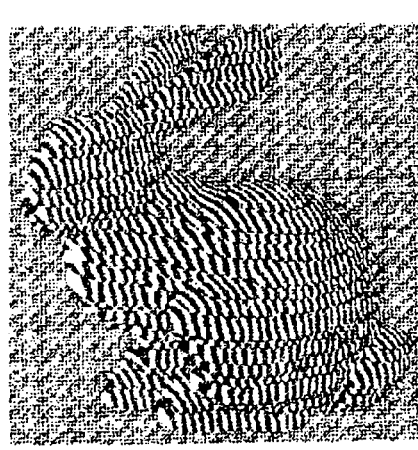
Figure 9:
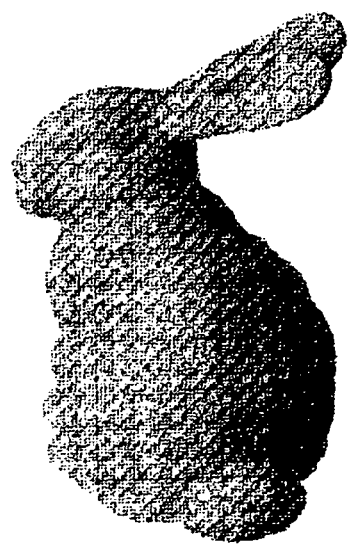

First, to demonstrate the effectiveness of the invention, the proposed method is tested using data synthesized by a simulation. The simulation is done using multiple grid patterns. The first pattern is uniformly spaced grid pattern. The second pattern is purpose-fully randomized to disturb the uniformity of the grid pattern. Using the second pattern, one can expect increased stability of searching for correspondences as already described reasons. The simulated images for each of the experimental grid patterns are shown in FIG. 9(A) and FIG. 9(B). In the images, the intervals of the vertical patterns were about 5 pixels. The intersections of the grid patterns were extracted from the images and the correspondences from the UHPPs and UVPPs to the CVPPs and CHPPs were determined using the proposed method. In the results of both patterns, the correct correspondences for all the UHPP and UVPP were selected and the reconstructed shapes exactly matched the ground truth. The shape obtained using the second pattern with the ground truth is shown in FIG. 9(C).

Figure 10:
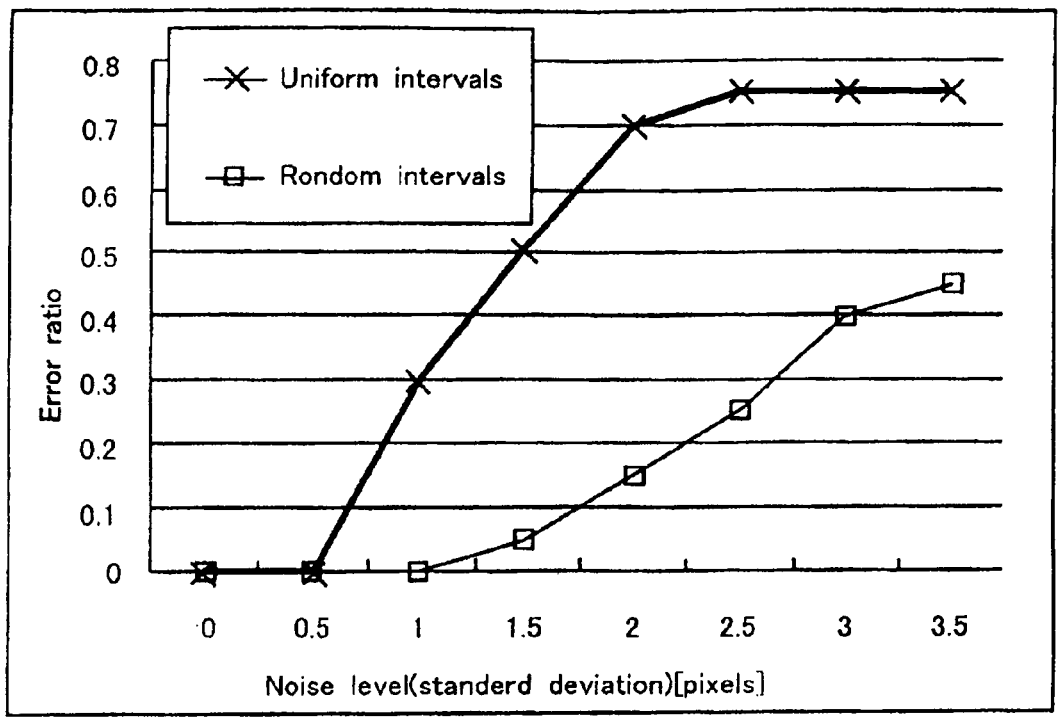
[FIG. 10] The figure illustrates the image processing method of the invention, and the graph illustrates the error to noise ratio.

Next, several experiment were conducted to evaluate the stability of the proposed method when the input data (the set of captured intersections) were disturbed by noise. Since the stability of the proposed method depends on the projected pattern, the two types of patterns shown in FIGS. 10(A) and (B) were used and isotropic 2D Gaussian noise was added to the captured intersections. The proposed method was applied to data with various noise levels, where noise levels were standard deviations of the noise in pixels. 20 tests were conducted for each noise levels. The error ratios of the searches of $i_{min}$ are shown in FIG. 10(C). The results confirmed that stability of the algorithm was improved using the pattern with random intervals.

Figure 11:
[FIG. 11] The figure illustrates the image processing method of the invention and the captured image of processing apparatus during scanning.

An actual 3D scanning system was built as shown in FIG. 11. Patterns were projected by a projector with a resolution of 1024×768 and scenes were captured by a CCD camera (720× 480 pixels). Then 3D reconstruction is conducted.

Figure 12:
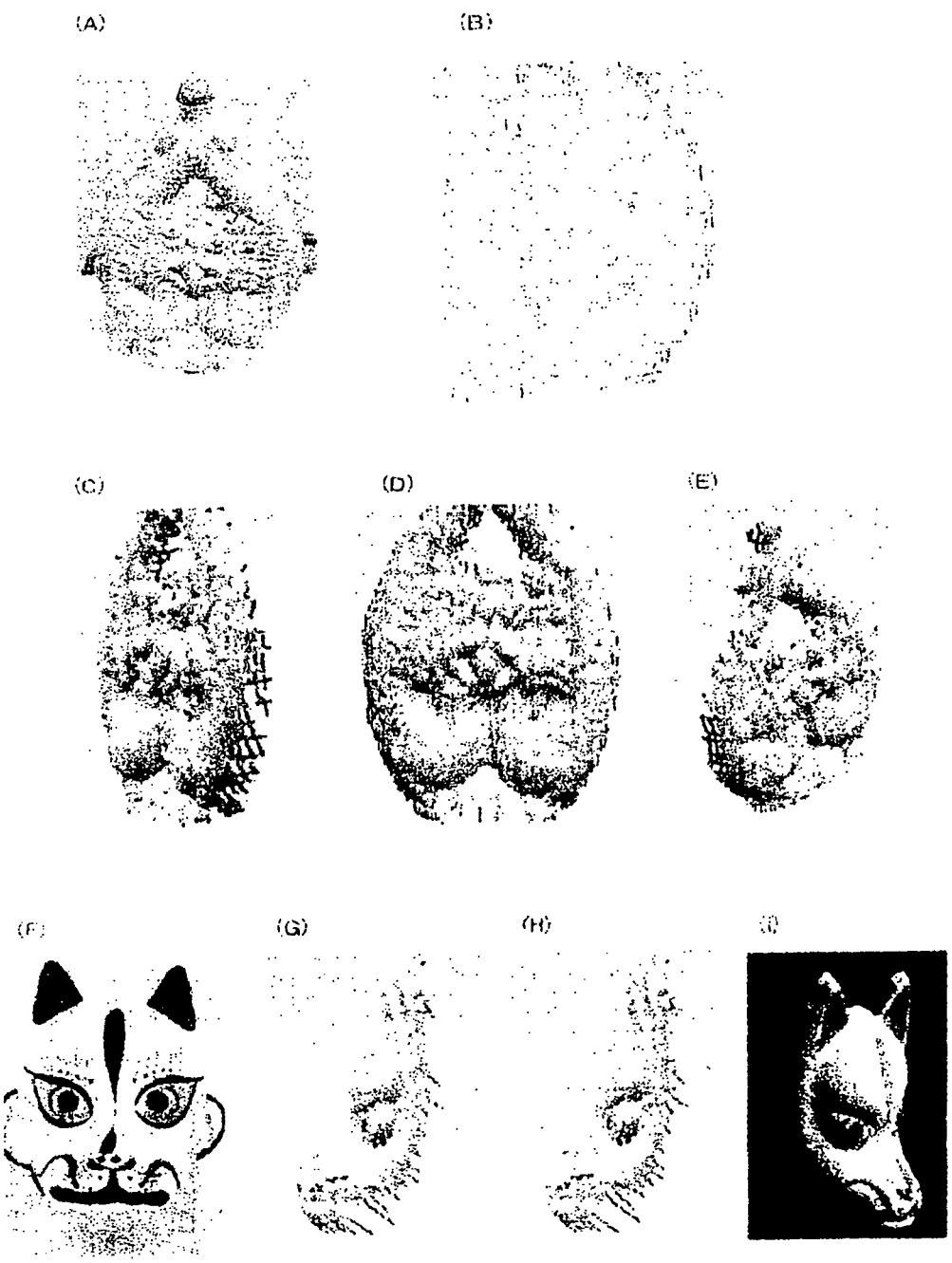
[FIG. 12] The figure illustrates the image processing method of the invention and, (A) and (B) illustrate the target object, (C), (D) and (E) illustrates the result of reconstitution, and (F) illustrates the target object, (G) and (H) illustrates the result of reconstitution and (I) illustrates the texture-mapped model.

FIG. 12 shows the captured scenes and results of reconstruction. In the experiment, a ceramic bottle, a paper mask and a ceramic jug with an intricate shape were captured. As is apparent, detailed shapes were successfully recovered with the current method. Specifically, FIG. 12(A) shows a target object, FIG. 12(B)-FIG. 12(E) show the reconstruction result. FIG. 12(F) shows a target object and FIG. 12(G)-FIG. 12(I) show the reconstruction result.

Figure 13:
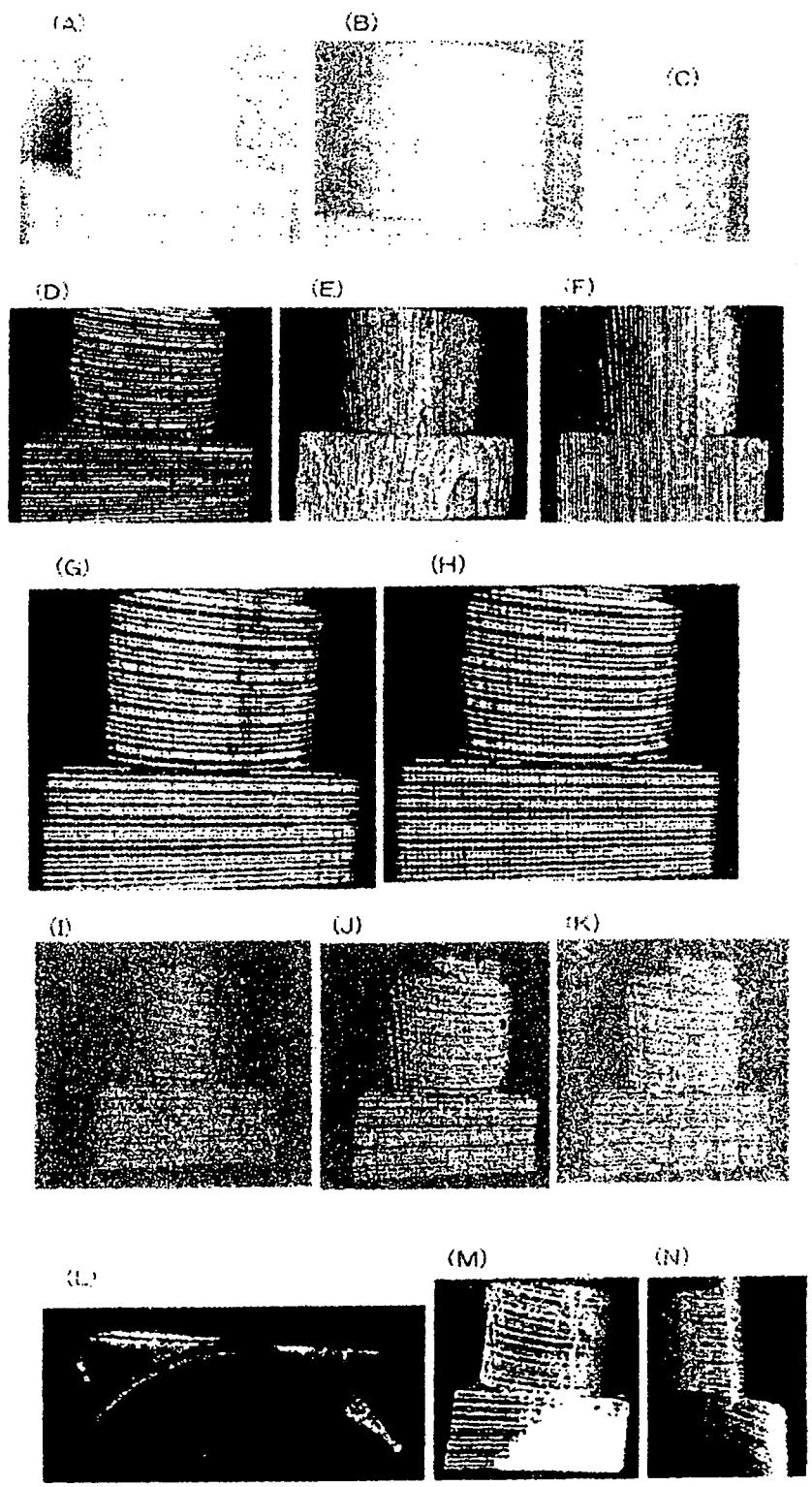
[FIG. 13] The figure illustrates the image processing method of the invention and (A) illustrates the captured object, (B) and (C) illustrates input image and (D) illustrates detected horizontal pattern, (E) illustrates detected dense vertical pattern, (F) illustrates detected sparse vertical pattern, (G) illustrates dense intersection of pattern, (H) illustrates sparse intersection of pattern, (I) illustrates reconstruction of dense pattern, (J) illustrates reconstruction of sparse pattern, (K) illustrates integration results and (L)-(N) illustrate both of reconstructed shape and ground truth.

Next, by referring FIG. 13, a scene of a box (size: 0.4 m×0.3 m×0.3 m) and a cylinder (height: 0.2 m, diameter: 0.2 m) was measured by the abovementioned coarse-to-fine method. For evaluation, the same scene was measured by a coded structured light method as a ground truth. Here, FIG. 13(A) shows the captured object, FIG. 13(B) and FIG. 13(C) show input image, FIG. 13(D) shows detected horizontal patterns, FIG. 13(E) shows detected dense vertical patterns, FIG. 13(F) shows detected coarse vertical patterns, FIG. 13(G) shows the intersection points of dense patterns, FIG. 13(H) shows intersection points of coarse patterns, FIG. 13(I) shows reconstructed shape of dense patterns, FIG. 13(J) shows reconstructed shape of coarse patterns, FIG. 13(K) shows the unified result, and FIG. 13(L)-FIG. 13(N) show the reconstructed shape and the ground truth shape.

By using combination of coarse and dense vertical patterns, the shape with different normal directions could be measured densely without missing regions. And, although there were small differences between the reconstruction and the ground truth, the RMS error of the reconstruction from the ground truth was 0.52 mm. Thus, the shape was correctly restored.

Figure 14:
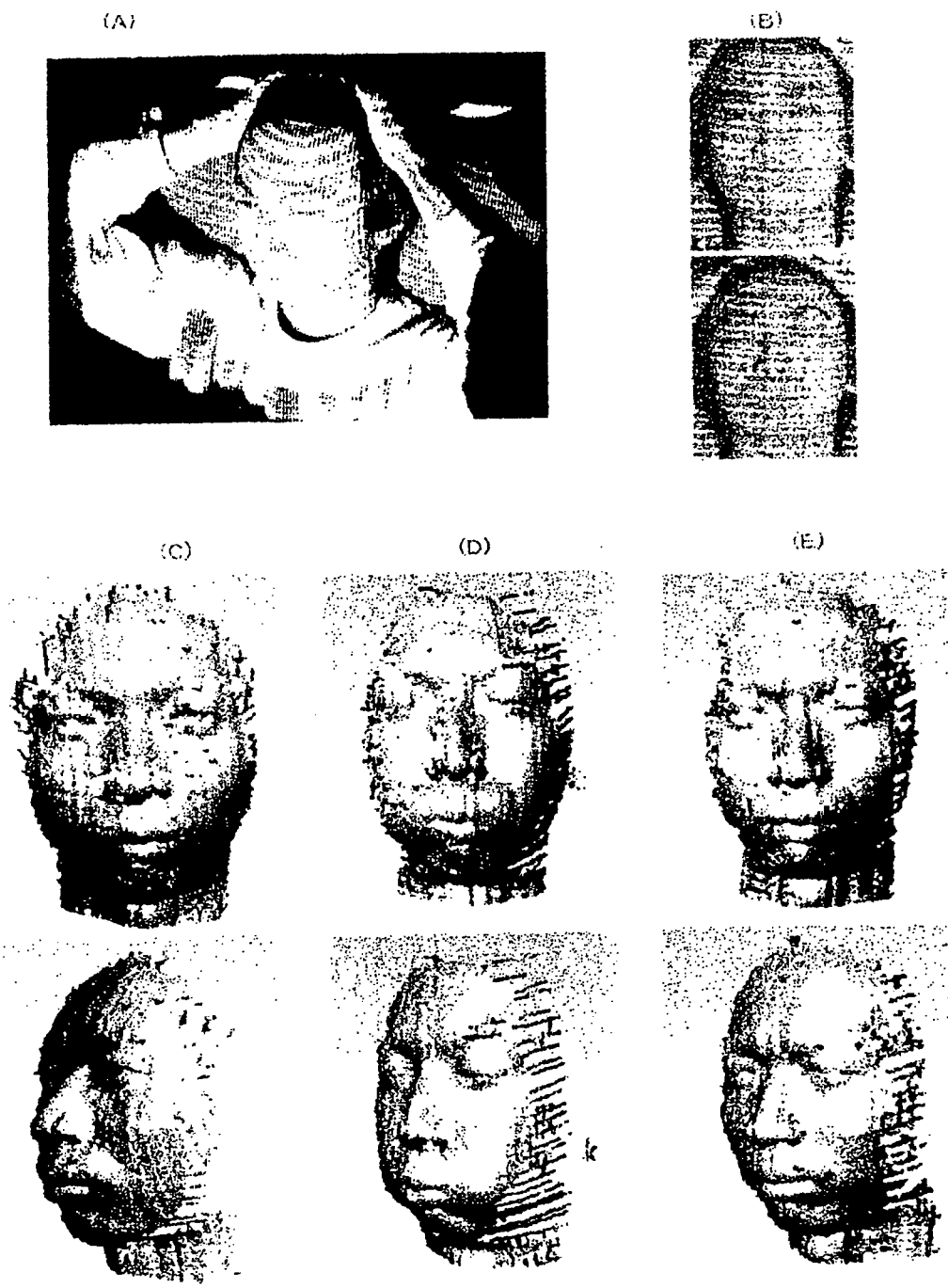
[FIG. 14] The figure illustrates the image processing method of the invention and (A) illustrates the input scene, (B) illustrates input image and (C)-(E) illustrates example of reconstruction of three 3 types of facial expression.

Finally, by referring FIG. 14, a human face was measured. The appearance of the experiment is shown in FIG. 14(A) and FIG. 14(B). Three examples of the reconstructed face expression is shown in FIGS. 14(C)-(E). Results indicate that the proposed method successfully restored the complex human facial expressions with dense and accurate 3D point clouds.

What is claimed is:

1. An image processing apparatus comprising:
a light projection unit using a light source,
said light source projecting a plane shaped light pattern, projecting a first pattern and a second pattern on an object,
said first pattern being arranged to fulfill a first common constraint, and
said second pattern being arranged to make intersections with said first pattern and fulfill a second common constraint;
an image capturing unit obtaining a 2D image by capturing a reflected pattern on said object,
said reflected pattern being a projection of said plane shaped light pattern; and
an image processing unit reconstructing a 3D shape of said object using said 2D image comprising:
a first calculation unit configured to obtain intersection points between a first captured pattern and a second captured pattern on said 2D image,
said first captured pattern being observed as a reflected pattern of said first pattern, and
said second captured pattern being observed as a reflected pattern of said second pattern; and
a second calculation unit configured to calculate a first solution of a first undetermined plane and a second undetermined plane by using a constraint, said first common constraint, said second common constraint, and a first relative positional information;
said first solution including a degree of freedom,
said first undetermined plane being a plane including said first captured pattern,
said second undetermined plane being a plane including said second captured pattern,
said constraint being that said intersection points are included by said first undetermined plane and said second undetermined plane, and
said first relative positional information being a relative positional information between said light projection unit and said image capturing unit,
wherein in said second calculation unit, said first solution including a degree of freedom is calculated by solving a first equation a second equation and a third equation;
said first solution being a solution of said intersection points, said first undetermined plane, or said second undetermined plane,
said first equation being derived from an image coordinate of said intersection points, a parameter of said first undetermined plane, and a parameter of said second undetermined plane,
said second equation derived from said first common constraint and said first relative positional information, and
said third equation derived from said second common constraint and said first relative positional information.

2. The image processing apparatus according to claim 1,
wherein said first common constraint is that all of said first pattern share a first common line or are parallel to each other; and
wherein said second common constraint is that all of said second pattern share a second common line or are parallel to each other.

3. The image processing apparatus according to claim 1,
wherein said first relative positional information used in said second calculation unit is calibrated prior to the process.

4. The image processing apparatus according to claim 2,
wherein in said second calculation unit, said first solution including a degree of freedom is calculated by solving first simultaneous linear equations, said first simultaneous linear equations being constructed from an image coordinate of said intersection points, a parameter representation of said first undetermined plane, and a parameter representation of said second undetermined plane;
said first solution being a solution of said intersection points, said first undetermined plane, or said second undetermined plane,
said parameter representation of said first undetermined plane being generated as a representation by one parameter obtained by utilizing the fact that said first undetermined plane share said first common line or are parallel to each other, and
said parameter representation of said second undetermined plane being generated as a representation by one parameter obtained by utilizing the fact that said second undetermined plane share said second common line or are parallel to each other.

5. The image processing apparatus according to claim 2,
wherein in said second calculation unit, said first solution including a degree of freedom are calculated by solving second simultaneous linear equations;
said first solution being a solution of said intersection points, said first undetermined plane, or said second undetermined plane;
said second simultaneous linear equations having only variable of parameter of said first undetermined plane and being generated by using the fact that a parameter of said second undetermined plane can be represented by a linear combination of a parameter of said first undetermined plane when first simultaneous linear equations hold, or when errors between both sides of first simultaneous linear equations becomes minimum;
said parameter of said first undetermined plane being defined from a representation of said first undetermined plane by one parameter obtained by utilizing the fact that said first undetermined plane shares said first common line or are parallel to each other;
said parameter of said second undetermined plane being defined from a representation of said second undetermined plane by one parameter obtained by utilizing the fact that said first undetermined plane shares said second common line or are parallel to each other; and
said first simultaneous linear equations being constructed from an image coordinate of said intersection points, said representation of said first undetermined plane, and said representation of said second undetermined plane.

6. The image processing apparatus according to claim 1, further comprising:
a third calculation unit configured to calculate a second solution where said degree of freedom of said first solution is eliminated by matching both or either:
a first correspondence relationship between a first determined plane and said first undetermined plane, said first determined plane being calculated from a first relative relationship and a second relative relationship between said first undetermined plane and said projection unit; or
a second correspondence relationship between a second determined plane and said second undetermined plane, said second determined plane being calculated from said second relative relationship and a third relative relationship between said second undetermined plane and said projection unit.

7. The image processing apparatus according to claim 1, further comprising:
a third calculation unit configured to calculate second solution where said degree of freedom of said first solution is eliminated by matching between:
an intersection line between said first undetermined plane and said second undetermined plane; and
an intersection line between a first determined plane and a second determined plane,
said first determined plane being calculated from a first relative relationship and the said second relative relationship between said first undetermined plane and said projection unit,
said second determined plane being calculated from a second relative relationship and a third relative relationship between said second undetermined plane and said projection unit.

8. The image processing apparatus according to claim 6, wherein in the third calculation unit, said degree of freedom of the said first solution is determined by minimizing the sum of differences of correspondences between either said first or second undetermined plane and either said first or second determined plane, said correspondences being defined by fixing said degree of freedom of said first solution.

9. The image processing apparatus according to claim 1,
wherein said first pattern and/or said second pattern are arranged to have irregular intervals.

10. The image processing apparatus according to claim 1,
wherein said light projection unit projects a third pattern which is different from said second pattern to said object; and
wherein in the image processing unit, performing both reconstruction of 3D shape of said object using said first pattern and said second pattern and reconstruction of 3D shape of said object using said first and third pattern, said reconstruction using said third pattern as replacement of said second pattern.

11. The image processing apparatus according to claim 1,
wherein said light projection unit projects one or more third patterns on said object, said third patterns being arranged to fulfill a third common constraint;
wherein, in said first calculation unit, a third captured pattern is obtained as a reflected pattern of said third pattern and intersection points between said first captured pattern, said second captured pattern, and said third captured pattern are obtained; and
wherein the second calculation unit is configured to calculate the first solution of said first undetermined plane and/or said second undetermined plane and/or third undetermined planes including a degree of freedom, said third undetermined planes being planes including said third patterns in 3D space, by using the constraint derived from the fact that said first undetermined plane and/or said second undetermined plane and/or said third undetermined planes share said intersection points, said first common constraint, said second common constraint, said third common constraint, and said first relative positional information.

12. The image processing apparatus according to claim 1,
wherein the said first solution of the said second calculation unit have a one degree of freedom.

13. An image processing method comprising:
a light projection step using a light source and a light projection unit, said light source projecting a plane shaped light pattern, projecting a first pattern and a second pattern to an object, said first pattern being arranged to fulfill a first common constraint, said second pattern being arranged to make intersections with said first pattern and fulfill a second common constraint;
an image capturing step using an image capturing unit, said image capturing unit obtaining a 2D image by capturing a reflected pattern on said object, said reflected pattern being lit by said light projection unit; and
an image processing step reconstructing a 3D shape of said object using said 2D image,
said image processing step comprising:
a first calculation step configured to obtain intersection points between a first captured pattern and a second captured pattern on said 2D image, said first captured pattern being observed as a reflected pattern of said first pattern, and said second captured pattern being observed as a reflected pattern of said second pattern; and
a second calculation step configured to calculate a first solution of a first undetermined plane and a second undetermined plane, said first solution including a degree of freedom, said first undetermined plane being a plane including said first captured pattern, said second undetermined plane being a plane including said second captured pattern, by using a constraint, said constraint being that said intersection points are included by said first undetermined plane and said second undetermined plane, said first common constraint, said second common constraint, and a first relative positional information between said light projection unit and said image capturing unit, wherein in said second calculation step, said first solution including a degree of freedom is calculated by solving a first equation, a second equation, and a third equation;

said first solution being a solution of said intersection points, said first undetermined plane, or said second undetermined plane, said first equation being derived from an image coordinate of said intersection points, a parameter of said first undetermined plane, and a parameter of said second undetermined plane, said second equation derived from said first common constraint and said first relative positional information, and said third equation derived from said second common constraint and said first relative positional information.

14. A non-transitory computer-readable storage medium storing a computer program capable of being executed on a computer to control an image processing apparatus, the program comprising:

a light projection step using a light source and a light projection unit, said light source projecting a plane shaped light pattern, projecting a first pattern and a second pattern to an object, said first pattern being arranged to fulfill a first common constraint, said second pattern being arranged to make intersections with said first pattern and fulfill a second common constraint;

an image capturing step using an image capturing unit, said image capturing unit obtaining a 2D image by capturing a reflected pattern on said object, said pattern being lit by said light projection unit; and an image processing step reconstructing a 3D shape of said object using said 2D image, said image processing step comprising:

a first calculation step to obtain intersection points between a first captured pattern and a second captured pattern on said 2D image, said first captured pattern being observed as a reflected pattern of said first pattern, and said second captured pattern being observed as a reflected pattern of said second pattern; and a second calculation step to calculate a first solution of a first undetermined plane and a second undetermined plane, said first solution including a degree of freedom, said first undetermined plane being a plane including said first captured pattern, said second undetermined plane being a plane including said second captured pattern, by using a constraint, said constraint being that said intersection points are included by said first undetermined plane and said second undetermined plane, said first common constraint, said second common constraint, and a first relative positional information between said light projection unit and said image capturing unit, wherein in said second calculation step, said first solution including a decree of freedom is calculated by solving a first equation, a second equation, and a third equation;

said first solution being a solution of said intersection points, said first undetermined plane, or said second undetermined plane, said first equation being derived from an image coordinate of said intersection points, a parameter of said first undetermined plane, and a parameter of said second undetermined plane, said second equation derived from said first common constraint and said first relative positional information, and said third equation derived from said second common constraint and said first relative positional information.

* * * * *